United States Patent
Huotari et al.

(10) Patent No.: US 11,889,542 B2
(45) Date of Patent: Jan. 30, 2024

(54) SYSTEMS AND METHODS FOR IDENTIFYING WIRELESS CHANNELS

(71) Applicant: COMCAST CABLE COMMUNICATIONS, LLC, Philadelphia, PA (US)

(72) Inventors: Allen Huotari, Sunnyvale, CA (US); Charles Moreman, Sunnyvale, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/382,063

(22) Filed: Jul. 21, 2021

(65) Prior Publication Data
US 2023/0029256 A1    Jan. 26, 2023

(51) Int. Cl.
*H04W 72/542* (2023.01)
*H04L 5/00* (2006.01)
*H04W 48/12* (2009.01)
*H04B 7/0456* (2017.01)

(52) U.S. Cl.
CPC ........ *H04W 72/542* (2023.01); *H04B 7/0486* (2013.01); *H04L 5/0062* (2013.01); *H04W 48/12* (2013.01)

(58) Field of Classification Search
None
See application file for complete search history.

(56) References Cited

U.S. PATENT DOCUMENTS

| | | | |
|---|---|---|---|
| 9,622,089 B1 | 4/2017 | Ngo et al. | |
| 9,807,619 B2 | 10/2017 | Tsai et al. | |
| 9,924,518 B2 | 3/2018 | Yi et al. | |
| 10,104,665 B2 | 10/2018 | Ngo et al. | |
| 10,257,832 B2 | 4/2019 | Ngo et al. | |
| 2013/0314267 A1* | 11/2013 | Kenney | G01S 7/021 342/21 |
| 2017/0041954 A1* | 2/2017 | Tsai | G01S 7/021 |
| 2018/0332583 A1* | 11/2018 | Shah | H04W 16/14 |
| 2018/0359763 A1* | 12/2018 | Kenkel | H04W 72/0453 |
| 2020/0187082 A1* | 6/2020 | Boehlke | H04W 36/30 |
| 2021/0099889 A1* | 4/2021 | Johnson | H04W 76/15 |

FOREIGN PATENT DOCUMENTS

| | | | | |
|---|---|---|---|---|
| EP | 1454162 B1 | 7/2011 | | |
| GB | 2545697 A | 6/2017 | | |
| WO | WO-2018172108 A1 * | 9/2018 | | A61B 5/00 |
| WO | WO-2019120566 A1 * | 6/2019 | | H04W 72/0406 |

* cited by examiner

*Primary Examiner* — Anh Vu H Ly
(74) *Attorney, Agent, or Firm* — Ballard Spahr LLP

(57) ABSTRACT

A network device may receive data for multiple wireless channels. The network device may determine an activity level or score for one or more of the wireless channels based on the received data. The network device may determine, based on the activity level for each wireless channel, a portion of the wireless channels that satisfy an activity level threshold. The network device may generate a ranking of the portion of the wireless channels that satisfy the activity level threshold. The ranking may be based on the activity level or score of each wireless channel. The network device may determine a wireless channel based on the ranking and may send an indication of the wireless channel to a user device.

40 Claims, 9 Drawing Sheets

SYSTEMS AND METHODS FOR IDENTIFYING WIRELESS CHANNELS

BACKGROUND

Continued implementation of wireless bands for use by devices, such as user devices, provides additional opportunity with regard to channel selection for individual networks. The additional implementation of these wireless bands may increase the number of channels available for use by the individual networks. The opportunity to selection from additional channels provides the potential for limiting interference between adjacent or overlapping networks.

However, providing channels within certain wireless bands and channel selection in certain wireless bands may be complicated by other factors. For example, in some wireless bands priority systems may be put in place that may give priority to certain uses of channels within a particular wireless band and thereby limit accessibility to one or more channels in the wireless band. Further complicating the issue is that a network device may not know if a particular channel is being used for the priority use prior to trying to make use of the channel.

SUMMARY

It is to be understood that both the following general description and the following detailed description are exemplary and explanatory only and are not restrictive. Methods and systems for identifying available network channels are described.

The system may include a network device or another computing device that may scan all or a portion of the channels in one or more wireless frequency bands. The network device or another computing device may receive scan data for each of the one or more channels scanned in the wireless frequency band. The network device or another computing device may also receive scan data or network data from other network devices, such as network devices within scanning range of the network device.

The network device may send the scan data and/or additional scan data or network data to a server or other computing device for analysis or the network device may conduct the analysis. The network device or the computing device may determine an activity level or score for all or a portion of the channels in the wireless frequency band and/or for which scan data was received. For example, the channels may include one or both of dynamic frequency selection (DFS) and non-DFS channels. In one example, an activity level or score may be determined for the non-DFS channels but not the DFS channels in the wireless frequency band. In another example, the activity level or score may be determined for the DFS channels but not the non-DFS channels in the wireless frequency band. In a further example, an activity level or score may be determined for both DFS and non-DFS channels in the wireless frequency band. The determination of the activity level or score may be based on at least a portion of the scan data. For example, the activity level or score for each channel may be based on the channel utilization for the particular channel and the number of overlapping basic service sets (OBSS) for the channel. The determination of the activity level or score for each channel may also be based on at least a portion of the additional scan data and/or historical network data. The additional scan data and/or historical network data may be stored and accessed locally by the network device or computing device or accessed from a remote database.

The network device or the computing device may adjust the activity level or score for one or more of the channels. The activity level or score may be adjusted based on a portion of the scan data, the additional scan data, and/or historical network data. For example, the activity level or score for a channel may be adjusted based on one or more of an expected channel utilization improvement for a channel, an expected channel noise floor for a channel, a number of non-DFS channels, an expected change of the channel utilization for a channel, a DFS history for a location, a DFS history for an adjacent location, or a pattern of a non-usage period. In certain examples, the activity level or score for the channels may not be adjusted.

The network device or the computing device may compare the activity level or score (e.g., the initial activity level or score or the adjusted activity level or score) of each of at least a portion of the channels to an activity level threshold to determine if the particular channel satisfies the activity level threshold. For example, channels with zero activity level or score may be less desirable as a channel option for use by the network device than channels with a small or moderate activity level or score. For example, the small or moderate activity level or score for a channel may be an indicator that the channel is not currently being used for other purposes, such as radar telemetry, in the location of the network device. For example, if the activity level threshold is set at greater than zero and the activity level or score for a channel is less than the activity level threshold (e.g., zero), then the channel does not satisfy the activity level threshold and the particular channel may not be further considered as an available channel (e.g., the channel may be a DFS channel where an activity level below the activity level threshold may indicate a potential use of the DFS channel for radar telemetry and may be removed from the listing of available channels for the wireless frequency band).

The network device or the computing device may generate a ranking or listing of the remaining channels (e.g., the non-DFS channels and the DFS channels that satisfy the activity level threshold) for the wireless frequency band. The network device or the computing device may rank the remaining channels based on the activity level or score or the adjusted activity level or score. In certain examples, the network device or the computing device may adjust the rankings based on a difference or percentage difference between an activity level or score (or adjusted activity level or score) for one type of channel as compared to the activity level or score (or adjusted activity level or score) for a another type of channel satisfying a threshold difference or threshold percentage difference. For example, the rankings may be adjusted based on a different or percentage difference between an activity level or score for a DFS channel as compared to the activity level or score for a non-DFS channel satisfying a threshold difference or threshold percentage difference.

The network device or the computing device may determine the highest ranking channel and whether the highest ranking channel is a DFS channel or a non-DFS channel. In examples where the computing device determines the activity level, adjusted activity level, and/or ranking of the channels, the computing device may send an indication of the highest ranking channel to the network device.

The network device, if the highest ranking channel is a DFS channel, may conduct a channel availability check for the highest ranking channel by scanning the highest ranking channel for a period of time to determine if any radar signals are detected during the period of time. If the network device receives a radar signal the channel may be considered unavailable for use by the network device, which may remove the particular channel from the ranking of channels or may send an indication to the computing device, that the channel is unavailable and the computing device may remove the channel from the ranking of channels. If the network device does not receive a radar signal during the period of time, the channel may be considered available for use and the network device may forward an indication of the channel to one or more user devices for use as a channel in the wireless network.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of the present description serve to explain the principles of the apparatuses and systems described herein.

DETAILED DESCRIPTION

Figure 1:
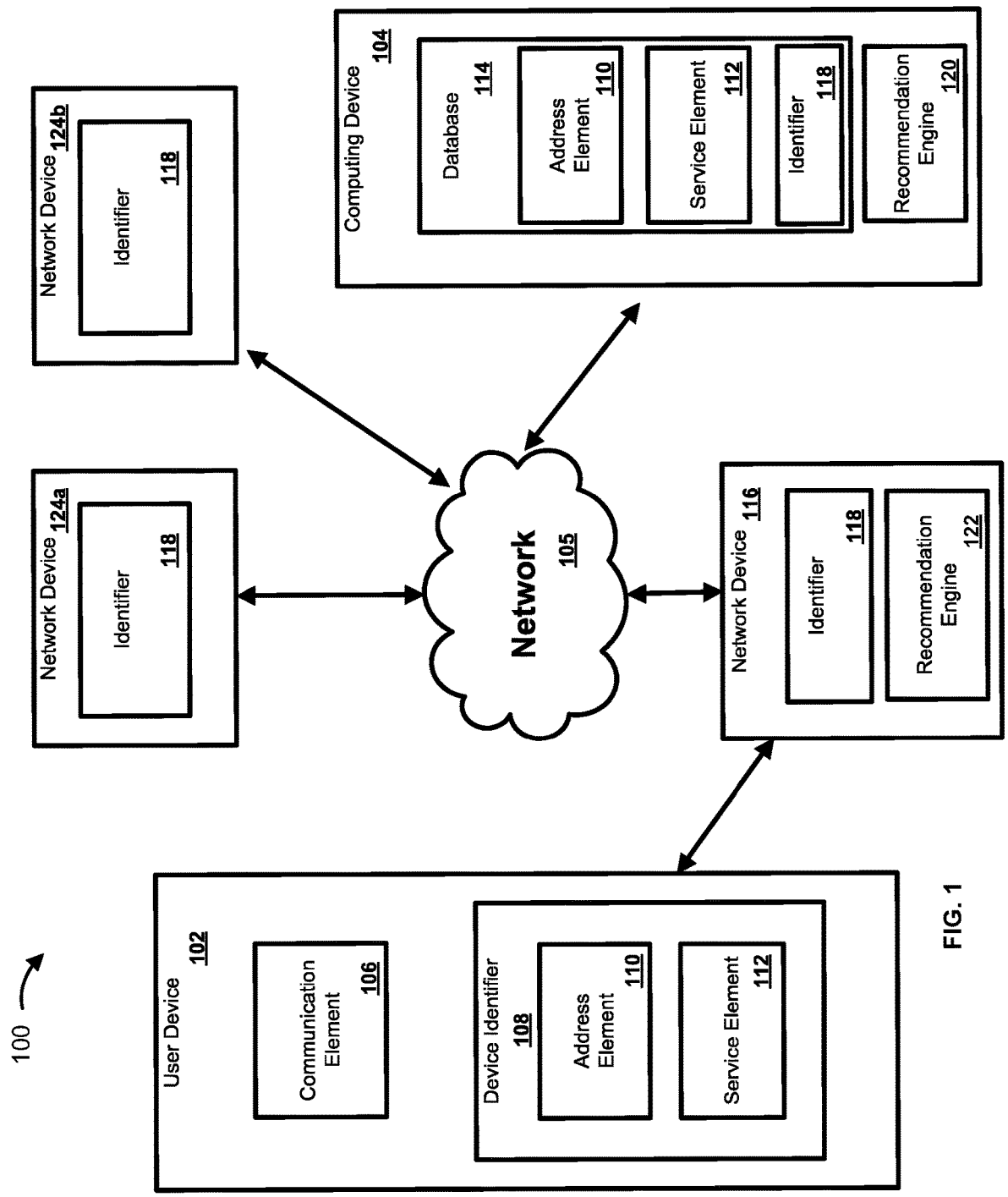
FIG. 1 shows an example system for identifying available network channels.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as a business or group). Content may be electronic representations of video, audio, text and/or graphics, which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

"Consuming content" or the "consumption of content," as those phrases are used herein, may also be referred to as "accessing" content, "providing" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio.

This detailed description may refer to a given entity performing some action. It should be understood that this language may in some cases mean that a system (e.g., a computer) owned and/or controlled by the given entity is actually performing the action.

Methods and systems are described herein for evaluating and selecting one or more channels of one or more wireless frequency bands for use by a network. The dynamic evaluation and selection of channels for use may improve the performance and reduce interference on the network by identifying the optimal channel or channels for use on a particular network. While selection of a channel that has zero RF activity may seem optimal, it may be a poor choice, as zero or low RF activity may suggest issues or problems with the particular channel. In one example, the wireless frequency band may include DFS and non-DFS channels. In certain examples, a DFS channel with zero or low RF activity may indicate that radar telemetry signals have been detected on the DFS channel in the area and, as such, the DFS channel may not be used for wireless communication in that location.

The system may include a network device (e.g., a wireless router, a gateway, an access point, a node, etc.) and a user device (e.g., an electronic device such as a computer, a smartphone, a laptop, a tablet, a set top box, a display device, or other device) capable of communicating with the network device. The network device may be configured as a local access network (LAN). The user device may be communicably coupled to the network device via the LAN. The system may also include a computing device (e.g., a server, cloud computer, etc.) communicably coupled to the network device (e.g., via a wired or wireless network). The system may also include one or more other network devices. Each of the one or more other network devices (e.g., a wireless router, gateway, access point, node, etc.) may be communicably coupled to the network device (e.g., via a wired or wireless network) and may be configured to provide additional network data and/or historical network data for networks adjacent to the LAN.

The network device may scan the channels in one or more wireless frequency bands (e.g., a 2.4 GHz band, a 5 GHz band or another band) and may receive scan data for each of the one or more channels. The network device may also receive scan data or network data from the one or more other network devices, such as network devices within scanning range of the network device. The network device may send the scan data, additional scan data, and/or network data to the computing device for analysis.

The computing device may determine an activity level or score for all or a portion of the channels in the wireless frequency band. For example, the channels may include one or both of DFS and non-DFS channels. For example, an activity level or score may be determined for both the DFS and non-DFS channels, for the non-DFS channels but not the DFS channels, or for the DFS channels but not the non-DFS channels. The determination of the activity level or score may be based on at least a portion of the scan data (e.g., the channel utilization for the particular channel and the number of overlapping basic service sets (OBSS) for the channel). The determination of the activity level or score for each channel may also be based on at least a portion of the additional scan data and/or historical network data.

The computing device may adjust the activity level or score for one or more of the channels based on a portion of the scan data, the additional scan data, and/or historical network data. For example, the activity level or score for a channel may be adjusted based on one or more of an expected channel utilization improvement for a channel, an expected channel noise floor for a channel, a number of non-DFS channels, an expected change of the channel utilization for a channel, a DFS history for a location, a DFS history for an adjacent location, or a pattern of a non-usage period for the channel.

The computing device may determine a portion of the channels and further evaluate that portion of the channels to determine if that portion of the channels satisfy an activity level threshold (e.g., remove one or more of the portion of the channels from consideration that have zero or a small amount of activity level or score that does not satisfy the activity level threshold). By not further evaluating or considering the portion of the channels that have zero or a small amount of activity level or score that does not satisfy the activity level threshold, it may reduce the likelihood that a selected channel from the portion of the channels is unavailable for one or more reasons (e.g., due to radar signals being detected on the channel). For example, the computing device may compare the activity level or score of each channel of the portion of the channels to an activity level threshold to determine if the channel satisfies the activity level threshold. For example, channels with zero activity level or score may be less desirable as a channel option for use by the network device than channels with a small or moderate activity level or score above an activity level threshold. For example, the small or moderate activity level or score for a channel, that is above the activity level threshold, may be an indicator that the channel is available for use as a network channel and is not currently being used for other purposes (e.g., radar telemetry) in the location of the network device. For example, if the activity level threshold is set at greater than zero and the activity level or score for a channel is less than the activity level threshold (e.g., zero), then the channel does not satisfy the activity level threshold and the particular channel may not be further evaluated or considered as an option for selection (e.g., may be removed from the listing of available channels for the wireless frequency band). For example, the activity level for the channel not satisfying the activity level threshold may indicate that the particular channel is being used for radar telemetry in the particular location. For example, the computing device may determine a portion of the channels that are DFS channels and further evaluate those DFS channels that satisfy an activity level threshold as described above (e.g., remove those DFS channels from consideration that have zero or a small amount of activity level or score that does not satisfy the activity level threshold).

The computing device may generate a ranking or listing, based on activity level or score, of the remaining channels (e.g., the non-DFS channels and the DFS channels that satisfy the activity level threshold) for the wireless frequency band. The computing device may determine the highest ranking channel and whether the highest ranking channel is a DFS channel or a non-DFS channel. The computing device may send an indication of the highest ranking channel to the network device. In certain examples, the network device may complete the operations discussed above instead of the computing device.

The network device, if the highest ranking channel is a DFS channel, may conduct a channel availability check for the highest ranking channel by scanning the highest ranking channel for a period of time to determine if any radar signals are detected during the period of time. If the network device receives a radar signal the channel may be considered unavailable for use by the network device, which may remove the particular channel from the ranking of channels or may send an indication to the computing device, that the channel is unavailable and the computing device may remove the channel from the ranking of channels. If the network device does not receive a radar signal during the period of time, the channel may be considered available for use and the network device may forward an indication of the channel to one or more user devices for use as a channel in the wireless network.

FIG. 1 shows a system 100 that may be configured to provide services, such as identifying and evaluating wireless channel activity for prioritization of the wireless channels, to a user device 102. The user device 102 may be in communication with a computing device 104 such as a server. The computing device 104 may be disposed locally or remotely relative to the user device 102. The user device 102 and the computing device 104 may be in communication via a private and/or public network 105 such as the Internet or a local area network. Other forms of communications may be used such as wired and wireless telecommunication channels.

The user device 102 may be an electronic device such as a computer, a smartphone, a laptop, a tablet, a set top box, a display device, or other device capable of communicating with the computing device 104. The user device 102 may comprise a communication element 106 for providing an interface to a user to interact with the user device 102 and/or the computing device 104. The communication element 106 may be any interface for presenting and/or receiving information to/from the user, such as presentation of one or more wireless channels for use by the user device 102. An interface may be a communication interface such as a web browser (e.g., Internet Explorer®, Mozilla Firefox®, Google Chrome®, Safari®, or the like). Other software, hardware, and/or interfaces may be used to provide communication between the user and one or more of the user device 102, a network device 116, and the computing device 104. The communication element 106 may request or query various files from a local source and/or a remote source. The communication element 106 may transmit data to a local or remote device such as the computing device 104 and the network device 116.

The user device 102 may be associated with a user identifier or device identifier 108. The device identifier 108 may be any identifier, token, character, string, or the like, for differentiating one user or user device (e.g., user device 102) from another user or user device. The device identifier 108 may identify a user or user device as belonging to a particular class of users or user devices. The device identifier 108 may comprise information relating to the user device such as a manufacturer, a model or type of device, a service provider associated with the user device 102, a state of the user device 102, a locator, and/or a label or classifier. Other information may be represented by the device identifier 108.

The device identifier 108 may comprise an address element 110 and a service element 112. The address element 110 may comprise or provide an internet protocol address, a network address, a media access control (MAC) address, an Internet address, or the like. The address element 110 may be relied upon to establish a communication session between the user device 102 and the computing device 104, the network device 116 or other devices and/or networks. The address element 110 may be used as an identifier or locator of the user device 102. The address element 110 may be persistent for a particular network.

The service element 112 may comprise an identification of a service provider associated with the user device 102 and/or with the class of user device 102. The class of the user device 102 may be related to a type of device, capability of device, type of service being provided, and/or a level of service (e.g., business class, service tier, service package, etc.). The service element 112 may comprise information relating to or provided by a communication service provider (e.g., Internet service provider) that is providing or enabling data flow such as communication services to the user device 102. The service element 112 may comprise information relating to a preferred service provider for one or more particular services relating to the user device 102. The address element 110 may be used to identify or retrieve data from the service element 112, or vice-versa. The one or more of the address element 110 and the service element 112 may be stored remotely from the user device 102 and retrieved by one or more devices such as the user device 102 and the computing device 104. Other information may be represented by the service element 112.

The computing device 104 may be a server for communicating with the user device 102. The computing device 104 may communicate with the user device 102 for providing data and/or services. The computing device 104 may provide services such as network (e.g., Internet) connectivity, network printing, media management (e.g., media server), wireless channel evaluation, content services, streaming services, broadband services, or other network-related services. The computing device 104 may allow the user device 102 to interact with remote resources such as data, devices, and files. The computing device may be configured as (or disposed at) a central location (e.g., a headend, or processing facility), which may receive content (e.g., data, input programming) from multiple sources. The computing device 104 may combine the content from the multiple sources and may distribute the content to user (e.g., subscriber) locations via a distribution system.

The computing device 104 may manage the communication between the user device 102 or the network device 116 and a database 114 for sending and receiving data therebetween. The database 114 may store a plurality of files (e.g., web pages), user identifiers or records, or other information. The user device 102 may request and/or retrieve a file from the database 114. The database 114 may store information relating to the user device 102 such as the address element 110 and/or the service element 112. The computing device 104 may obtain the device identifier 108 from the user device 102 and retrieve information from the database 114 such as the address element 110 and/or the service elements 112. The computing device 104 may obtain the address element 110 from the user device 102 and may retrieve the service element 112 from the database 114, or vice versa. Any information may be stored in and retrieved from the database 114. The database 114 may be disposed remotely from the computing device 104 and accessed via direct or indirect connection. The database 114 may be integrated with the computing system 104 or some other device or system.

The computing device 104 may also include and/or manage communication between the network device 116 and a recommendation engine 120. The recommendation engine 120 may include a plurality of files (e.g., channel options, channel data, historical channel usage data, etc.) or other information. The computing device 104 may receive channel data for a plurality of wireless channels from a network device 116 and may provide it to the recommendation engine 120. The recommendation engine 120 may process the received channel data, and optionally other data, to determine activity levels for one or more of the channels for which data was received. The recommendation engine 120 may evaluate the activity levels and the channel type of each channel and remove channels as selectable options for which the activity level satisfies a threshold level or fails to satisfy a threshold level. The recommendation engine 122 may evaluate the remaining channels and determine a priority for usage of each channel by the user device 102. The recommendation engine 120 may transmit or send the highest priority channel and/or all or a portion of the priority listing of channels to the network device 116.

One or more network devices 116 may be in communication with a network such as a network 105. One or more of the network devices 116 may facilitate the connection of a device, such as the user device 102, to the network 105. One or more of the network devices 116 may be configured as a wireless access point (WAP). One or more network devices 116 may be configured to allow one or more wireless devices to connect to a wired and/or wireless network using Wi-Fi, Bluetooth or any desired method or standard.

The network devices 116 may be configured as a local area network (LAN). One or more network devices 116 may comprise a dual band wireless access point. The network devices 116 may be configured with a first service set identifier (SSID) (e.g., associated with a user network or private network) to function as a local network for a particular user or users. The network devices 116 may be configured with a second service set identifier (SSID) (e.g., associated with a public/community network or a hidden network) to function as a secondary network or redundant network for connected communication devices.

One or more network devices 116 may comprise an identifier 118. One or more identifiers may be or relate to an Internet Protocol (IP) Address IPV4/IPV6 or a media access control address (MAC address) or the like. One or more identifiers 118 may be a unique identifier for facilitating communications on the physical network segment. Each of the network devices 116 may comprise a distinct identifier 118. The identifiers 118 may be associated with a physical location of the network devices 116.

One or more network devices 116 may comprise a recommendation engine 122. The recommendation engine 122 may include a plurality of files (e.g., channel options, channel data, historical channel usage data, etc.) or other information. The one or more network devices 116 may scan for and receive wireless channel data for a plurality of wireless channels and may provide it to the recommendation engine 122. The wireless channel data may be received by the one or more network devices 116 from the one or more other network devices 124a, 124b. The recommendation engine 122 may process the received channel data, and optionally other data, to determine activity levels for one or more of the channels for which data was received. The recommendation engine 122 may evaluate the activity levels and the channel type of each channel and remove channels as selectable options for which the activity level satisfies a threshold level or fails to satisfy a threshold level. The recommendation engine 122 may evaluate the remaining channels and determine a priority for usage of each channel by the user device 102. The recommendation engine 120 may transmit or send the highest priority channel and/or all or a portion of the priority listing of channels to the user device 102.

One or more network devices 124a, 124b may be in communication with a network such as a network 105. One or more of the network devices 124a, 124b may also facilitate the connection of a device, such as the user device 102, to the network 105. One or more of the network devices 124a, 124b may be configured as a wireless access point (WAP). One or more network devices 116 may be configured to allow one or more wireless devices to connect to a wired and/or wireless network using Wi-Fi, Bluetooth or any desired method or standard.

The one or more network devices 124a, 124b may be configured as a local area network (LAN). One or more network devices 124a, 124b may comprise a dual band wireless access point. The network devices 124a, 124b may be configured with a first service set identifier (SSID) (e.g., associated with a user network or private network) to function as a local network for a particular user or users. The network devices 124a, 124b may be configured with a second service set identifier (SSID) (e.g., associated with a public/community network or a hidden network) to function as a secondary network or redundant network for connected communication devices.

One or more network devices 124a, 124b may comprise an identifier 118. One or more identifiers may be or relate to an Internet Protocol (IP) Address IPV4/IPV6 or a media access control address (MAC address) or the like. One or more identifiers 118 may be a unique identifier for facilitating communications on the physical network segment. Each of the network devices 124a, 124b may comprise a distinct identifier 118. The identifiers 118 may be associated with a physical location of the network devices 124a, 124b.

Figure 2:
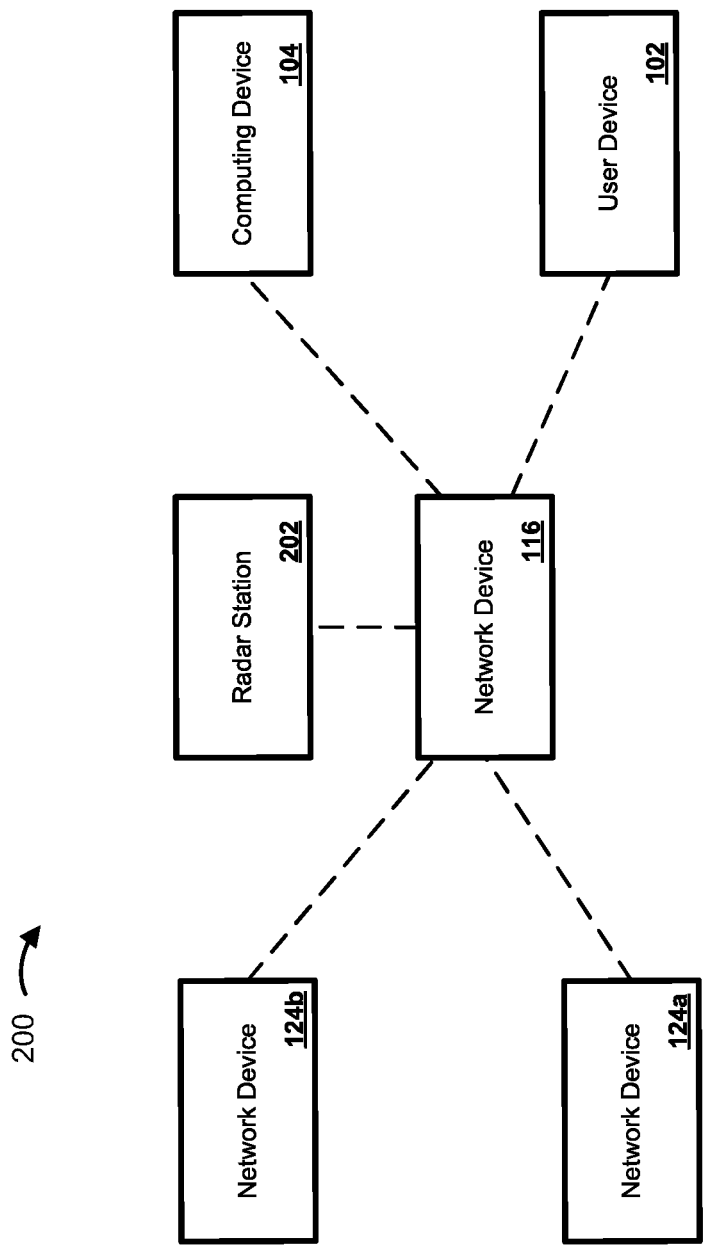
FIG. 2 shows an example system for identifying network channels.

FIG. 2 shows an example system 200 for identifying network channels. Those skilled in the art will appreciate that digital equipment and/or analog equipment may be employed. One skilled in the art will appreciate that provided herein is a functional description and that the respective functions may be performed by software, hardware, or a combination of software and hardware.

The system 200 may include a network device 116, one or more other network devices 124a, 124b, a computing device 104, a user device 102, and/or a radar station 202. As will be appreciated by one skilled in the art, the system 200 may have any quantity of network devices 116, 124a, 124b, computing devices 104, user devices 102, and radar stations 202. The network device 116, 124a, 124b may be a wireless communication device (e.g., a wireless router, a gateway, an access point, a node, etc.). Each network device 116, 124a, 124b may utilize one or more communication protocols to communicate on one or more wireless networks. The one or more wireless networks may communicate via a wireless communication channel. For example, each of the network devices 116, 124a, 124b may utilize a Wi-Fi communication protocol. Each of the network devices 116, 124a, 124b may be configured with one or more Service Set Identifiers (SSIDs) (e.g., associated with a user network or private network) to function as a local network for a particular user or users.

The computing device 104 may be an electronic device such as a server, a computer, a smartphone, a laptop, a tablet, a set top box, a display device, or other device capable of communicating with the network device 116. The computing devices 104 may communicate with the network device 116 via a wired or wireless communication network 105. The computing devices 104 may utilize the network 105 to communicate with the network device 116. The computing devices 104 may communicate via the network device 116 with one or more user devices 102.

The user devices 102 may be any electronic device such as a computer, a smartphone, a laptop, a tablet, a set top box, a display device, etc.), and so forth. The user devices 102 may utilize a wireless network (e.g., a Wi-Fi network) to communicate with the network device 116. The user devices 102 may pair with the network device 116. The user devices 102 may pair with the network device 116 prior to communicating via the first wireless network (e.g., the Wi-Fi network).

The network device 116 may scan all or a portion of the channels in one or more wireless frequency bands. The frequency band may be a 2.4 GHz band, a 5 GHz frequency band or another frequency band. The scan may occur subsequent to a boot up or reboot of the network device 116 or during normal operation of the network device 116 (e.g., based on an indication that one or more user devices 102 is experiencing issues (e.g., latency, dropped connections) with the current channel being used. The network device 116 may receive scan data for each of the one or more channels scanned in the wireless frequency band. The network device 116 may also receive scan data or network data from other network devices 124a, 124b within scanning range of the network device 116.

The network device 116 may send the scan data and additional scan data or network data to the computing device 104 for analysis or may conduct the analysis locally at the network device 116. The network device 116 or the computing device 104 may determine an activity level or score for all or a portion of the channels in the wireless frequency band. For example, an activity level or score may be determined for the non-DFS channels but not the DFS channels in the wireless frequency band. For example, the activity level or score may be determined for the DFS channels but not the non-DFS channels in the wireless frequency band. The determination of the activity level or score by the network device 116 or the computing device 104 may be based on at least a portion of the scan data. For example, the activity level or score for each channel may be based on the channel utilization for the particular channel and the number of overlapping basic service sets (OBSS) for the channel. The determination of the activity level or score for each channel may also be based on at least a portion of the additional scan data and/or historical network data. The additional scan data and/or historical network data may be stored and accessed locally by the network device 116 or computing device 104 or accessed from a remote database.

The network device 116 or the computing device 104 may adjust the activity level or score for one or more of the channels. The activity level or score may be adjusted based on a portion of the scan data, the additional scan data, and/or historical network data. For example, the activity level or score for a channel may be adjusted based on one or more of an expected channel utilization improvement for a channel, an expected channel noise floor for a channel, a number of non-dynamic frequency selection (DFS) channels, an expected change of the channel utilization for a channel, a DFS history for a location, a DFS history for an adjacent location, or a pattern of a non-usage period. In certain examples, the activity level or score for the channels may not be adjusted.

The network device 116 or the computing device 104 may determine a portion of the channels. For example, the network device 116 may determine a portion of the channels that are DFS channels. The network device 116 or the computing device 104 may compare the activity level or score (e.g., the initial activity level or score or the adjusted activity level or score) of each channel of the portion of the channels to an activity level threshold to determine if the channel satisfies the activity level threshold. For example, channels with zero or very little activity level or score may be less desirable as a channel option for use by the network device 116 than channels with a moderate activity level or score that satisfies an activity level threshold. For example, if the activity level threshold is set at greater than zero and the activity level or score for a channel is less than the activity level threshold, then the channel does not satisfy the activity level threshold and the network device 116 or the computing device 104 may remove the particular channel from the listing of available channels for the wireless frequency band. For example, the activity level or score for the channel not satisfying the activity level threshold may indicate that the particular channel is being used for radar telemetry in the particular location.

For example, the network device 116 may determine a portion of the channels that are DFS channels and may compare the activity level or score (e.g., the initial activity level or score or the adjusted activity level or score) of each DFS channel to a activity level threshold to determine if the DFS channel satisfies the activity level threshold. For example, DFS channels with zero or very little activity level or score may be less desirable as a channel option for use by the network device 116 than DFS channels with a moderate activity level or score that satisfies an activity level threshold, because the DFS channel with zero or very little activity level may be an indicator that the particular DFS channel is being used for radar telemetry in the location of the network device 116. For example, if the DFS channel does not satisfy the activity level threshold, the network device 116 or the computing device 104 may remove the DFS channel from the listing of available channels for the wireless frequency band.

The network device 116 or the computing device 104 may generate a ranking or listing of the remaining channels for the wireless frequency band. The network device 116 or the computing device 104 may rank the remaining channels based on the activity level or score or the adjusted activity level or score. For example, the network device 116 or the computing device 104 may rank the remaining channels in order from the lowest activity level or score (or lowest adjusted activity level or score) to the highest activity level or score (or highest adjusted activity level or score). In certain examples, the network device 116 or the computing device 104 may adjust the rankings based on a difference or percentage difference between an activity level or score (or adjusted activity level or score) for a DFS channel as compared to the activity level or score (or adjusted activity level or score) for a non-DFS channel satisfying a threshold difference or threshold percentage difference.

The network device 116 or the computing device 104 may determine the highest ranking channel and whether the highest ranking channel is a DFS channel or a non-DFS channel. In examples where the computing device 104 determines the activity level, adjusted activity level, and/or ranking of the channels, the computing device 104 may send (e.g., via the network 105) an indication of the highest ranking channel to the network device 116. The computing device 104 may additionally send (e.g., via the network 105) all or a portion of the channel rankings to the network device 116.

The network device 116, if the highest ranking channel is a DFS channel, may scan the highest ranking channel for a period of time to determine if any radar signals are received (e.g., from the radar station 202) during the period of time. For example, the period of time may be between 1-10 minutes. For example, the period of time may be one minute. If the network device 116 receives a radar signal (e.g., from the radar station 202) the channel may be considered unavailable for use by the network device 116. The network device 116 may remove the particular channel from the ranking of channels or may send an indication (e.g., via the network 105) to the computing device 104, that the channel is unavailable and the computing device 104 may remove the channel from the ranking of channels. If the network device 116 does not receive a radar signal during the period of time, the channel may be considered available for use and the network device 116 may forward an indication of the channel to one or more user devices 102 for use as a channel in the wireless network.

Figure 3:
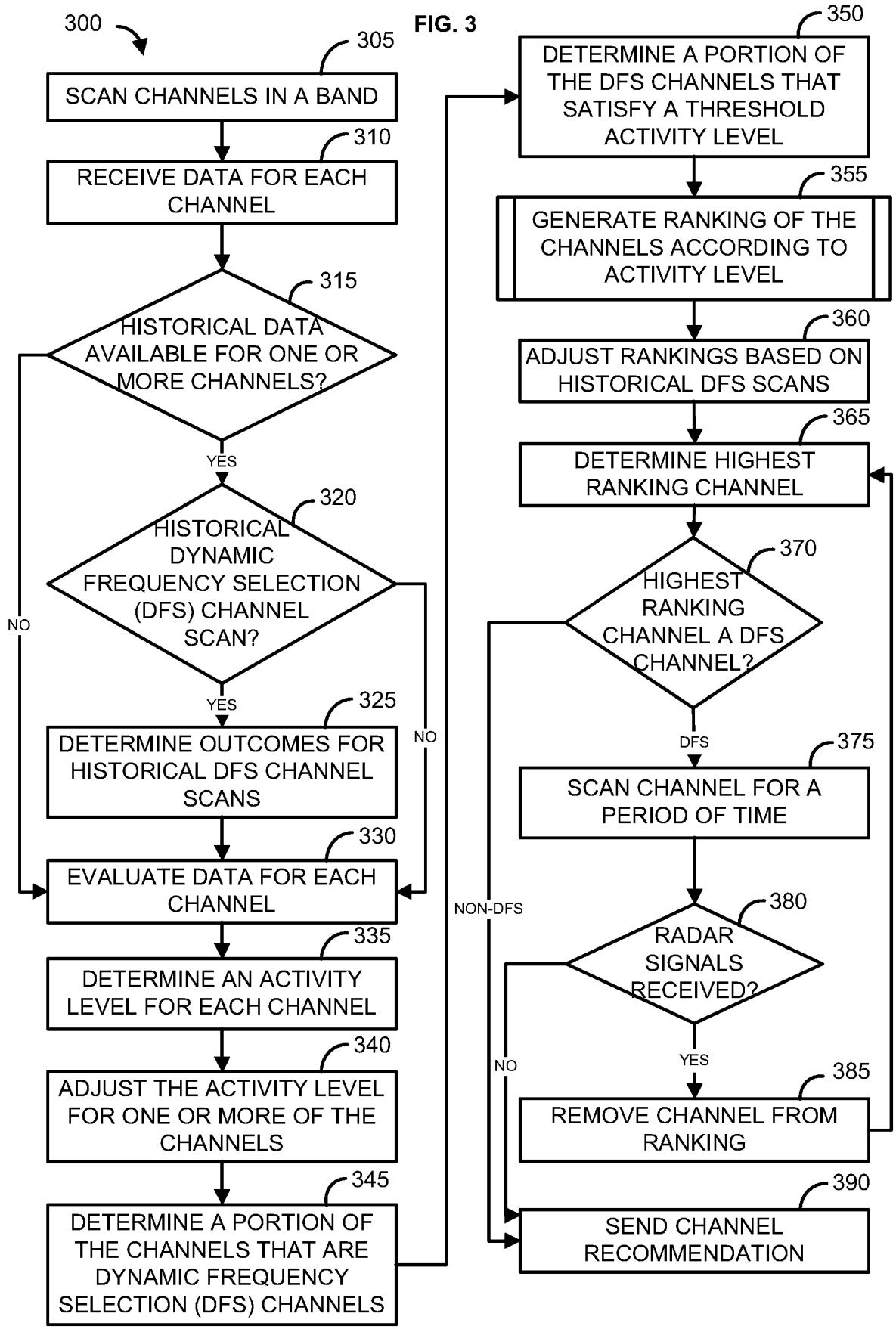
FIG. 3 shows a flowchart of an example method for identifying a network channel for use.

FIG. 3 is a flowchart of an example method 300 for identifying a network channel for use in a wireless network by a network device (e.g., the network device 116) and a user device (e.g., the user device 102). For example, the network device 116 may have recently booted up or been rebooted. For example, the user device 102 may alternatively have been communicably connected to the network 105, such as a local area network (LAN), a general wide area network (WAN), and/or the Internet, via the network device 116 using a first wireless channel. The first wireless channel may no longer be operating or operating properly (e.g., latency issues, dropping out). A network device 116 and/or a computing device 104 communicably coupled to the network device 116 (e.g., via the network 105) may evaluate one or more channels in one or more wireless frequency bands (e.g., 5 GHz, 2.4 GHz, etc.). The network device 116 and/or computing device 104 may determine, based on the evaluation, which channel or channels to recommend for use by the network device 116 for network communications with the user device 102.

At 305, a computing device (e.g., the network device 116, such as a gateway, router, access point, node, etc.) may scan each wireless channel in one or more wireless frequency bands. For example, the computing device (e.g., the network device 116) may passively scan each available channel in one or more wireless frequency bands. For example, one of the one or more wireless frequency bands may be a 5 gigahertz (GHz) band and each available wireless channel may be 20 megahertz (MHz), 40 MHz, 80 MHz, or 160 MHz, within the 5 GHz band. For example, one of the one or more wireless frequency bands may be a 2.4 GHz band, a 3.6 GHz band, a 4.9 GHz band, a 5.9 GHz band, or another frequency band now known or hereinafter developed). For example, the scan may be a passive scan. The amount of time that each channel is scanned by the network device 116 may be fixed or configurable to the user's needs. The scanning time for each channel may be continuous or segmented. For example, the scanning time for each channel may be between 100 milliseconds and 10,000 milliseconds. Shorter or longer scanning times may also be employed. The wireless channels within the wireless frequency band may include dynamic frequency selection (DFS) channels and non-DFS channels. For example, the network device 116 may only scan the non-DFS channels in the wireless frequency band. For example, the network device 116 may scan all of the non-DFS channels in the wireless frequency band before scanning the DFS channels in the wireless frequency band.

At 310, the computing device (e.g., the network device 116) may receive scan data for each wireless channel scanned in the wireless frequency band. For example, the network device 116 may receive local Wi-Fi airtime utilization data for each channel scanned in the wireless frequency band. For example, the local Wi-Fi airtime utilization data for each channel scanned may include a number of overlapping basic service sets (OBSS) heard, a channel utilization per OBSS, a channel utilization per channel, a presence of P20, S20, S40low, and/or S40high. The received scan data may be transmitted or sent to a recommendation engine (e.g., the recommendation engine 122 or another processing software for analysis. In certain examples, the transmission is an internal transmission within the network device 116. In other examples, the received scan data may be transmitted or sent from the network device 116 to another computing device (e.g., the computing device 104) for analysis.

At 315, a determination may be made as to whether historical data is available related to DFS channel usage for each of the wireless channels that have been scanned. For example, the computing device (e.g., the network device 116) may compare each wireless channel scanned to historical information for each of the wireless channels scanned in the frequency band. For example, the network device 116 may send an indicator of each wireless channel scanned to another computing device (e.g., the computing device 104) via the network 105 to determine if historical information related to DFS channel usage for each of the wireless channels is available. The computing device 104 may receive DFS channel usage information and statistics from the network device and/or other computing devices (e.g., network devices 124*a*, 124*b*) and may store this historical information in memory in, for example, the recommendation engine 120. The historical information may provide information related to the success or lack of success of using a DFS channel. For example, the historical information may include an indication of whether the wireless channel is a DFS channel, whether the wireless channel is being used for RADAR, and/or whether the wireless channel has previously been successfully used for communication. The historical information for each channel may be time-limited. For example, the historical information for each channel may only be stored for a predetermined period of time, such as one week, one month, two months, six months, one year, or any other time period desired. Limiting the storage of the historical information for each wireless channel may provide more up-to-date information about each wireless channel. Identifying a network channel for usage and evaluating wireless DFS channels for usage at the network device 116 may be costly from a time and usage viewpoint. Obtaining historical information about the wireless channels being evaluated may assist in the process and reduce the time and usage needs from the network device 116. If no historical information for the one or more wireless channels is available, either at the network device 116 and/or at the computing device 104, then the NO branch may be followed to 330. If historical information for one or more of the wireless channels that have been scanned is available, the YES branch may be followed to 320.

At 320, a determination may be made as to whether the available historical data for the scanned wireless channels of the computing device (e.g., the network device 116) includes historical DFS channel scan data. For example, the historical DFS channel scan data may have been provided by the network device 116 or another computing device (e.g., network devices 124a, 124b). The determination may be made by the network device 116 or another computing device (e.g., the computing device 104). The historical DFS channel scan data may include an indication of whether the particular wireless channel was available or unavailable for use by a network device and/or whether radar activity was previously detected on the particular wireless channel. If historical DFS channel scan data is not available for one or more of the wireless channels scanned by the network device 116, the NO branch may be followed to 330. If historical DFS channel scan data is available for one or more of the wireless channels scanned by the network device 116, the YES branch may be followed to 325.

At 325, the computing device (e.g., the network device 116) may determine or evaluate the outcomes of the historical DFS channels scans available for the one or more wireless channels scanned by the network device 116. For example, the network device 116 may determine if radar activity was previously detected on one or more of the wireless channels scanned, based on the available historical data. In certain examples, the network device modify the rankings of the one or more channels for which historical DFS channel scan data is available. For example, if a scanned channel was previously determined to have radar activity thereon, based on the historical DFS channel scan data, the overall ranking of that particular wireless channel may be lowered and/or removed completely from the ranking discussed in 355. For example, if a scanned channel was previously determined to not have radar activity thereon, based on the historical DFS channel scan data, the overall ranking of that particular wireless channel may be raised or immediately selected for recommendation. For example, if all of the scanned DFS channels were previously determined to have radar activity thereon, the network device 116 may determine to not attempt to use a DFS channel and may immediately select a non-DFS channel for recommendation.

At 330, the computing device (e.g., the recommendation engine 122 of the network device 116) may evaluate the received data for each channel to determine an activity level, or how quiet, each channel is. For example, the activity level for each channel may be determined based on the channel utilization and/or the number of OBSS for each channel from the received channel data. For example, the channel utilization for each channel may be compared to a threshold value to indicate if the particular channel has a high or low activity level. For example, the activity level for each channel may be additionally or alternatively determined based on the number of beacons heard by the channel. For example, the number of beacons heard may be compared to a threshold number of beacons heard to indicate if the particular channel has a higher or lower activity level. For example, the activity level for each channel may be additionally or alternatively determined based on the number of beacons heard by the channel that are above or below a received power threshold (e.g., received signal strength indicator (RSSI) or received channel power indicator (RCPI)). For example, the activity level for each channel may be additionally or alternatively determined based on the number of frames overheard that are outside of the basic service set (BSS) as compared to a threshold value of overheard frames to indicate if the particular channel has a higher or lower activity level.

At 335, the computing device (e.g., the recommendation engine 122 of the network device 116) may determine an activity level or score for each channel. For example, the activity level may be a score or numerical indicator of the activity level and/or busyness of the particular channel. For example, the activity level or score may be determined based on at least a portion of the scan data. For example, the activity level may be determine based at least on one or more of the following parameters: the number of OBSS heard by the channel, the channel utilization for the channel, the number of beacons heard on the channel, the RSSI, the RCPI, the number of frames heard that are outside the BSS. For example, other scan data for the channel may be used in addition to or in the alternative for any of the other scan data listed. For example, each parameter may be compared to one or more thresholds. The thresholds may define boundaries or ranges (e.g., a range between a first threshold and a second threshold and a second range between a second threshold and a third threshold for the parameter and so on). Each range or set of values between a pair of thresholds may be assigned or associated with a weighting value (e.g., a number or score) for the particular parameter. These weighting values may be determined for each of the parameters chosen to be included in the activity level based on a comparison of each parameter to particular ranges or values between pairs of thresholds to determine or identify the associated weighted value. Then, for example, the weighted values of each of the parameters chosen to be included in the activity level may be summed to determine the activity level for the particular channel.

For example, if only non-DFS channels are scanned by the network device 116, then the recommendation engine 122 may only determine an activity level for each of the non-DFS channels in the wireless frequency band. In this example, the recommendation engine 122 may, for each of the DFS channels in the wireless frequency band which have not been scanned or for which scan data has not been received, determine that each DFS channel has a lower activity level/score than the non-DFS channel with the lowest activity level/score. In this example, the DFS channel that is least busy may be the first channel selected for a channel availability check.

At 340, the computing device (e.g., the recommendation engine 122 of the network device 116) may adjust the activity level or score for one or more of the channels for which scan data was received. For example, certain received scan data and/or historical data for a channel may be used to increase or decrease the channel's activity level or score. For example, high expected channel utilization improvement for the particular channel may be used to improve (e.g., reduce) the activity level or score for the particular channel. For example, the computing device may determine an expected channel utilization for the channel based on switching to the channel and may compare the current channel utilization to the expected channel utilization for the channel to determine an amount or level of channel utilization improvement or deterioration. The expected channel utilization for a channel may be determined based on the current on-channel utilization, the channel utilization based on the same BSS traffic, and the predicted off-channel DFS channel utilization. For example, the expected channel utilization for a channel may be determined by subtracting channel utilization based on the same BSS traffic from the current on-channel utilization. The predicted off-channel DFS channel utilization may then be added to the result. The current on-channel utilization, the channel utilization based on the same BSS traffic, and the predicted off-channel DFS channel utilization may be determined by the recommendation engine 122 from the received scan data and/or the stored channel data stored at the network device 116 or the computing device 104.

For example, high expected noise floor improvement for the particular channel may be used to improve (e.g., reduce) the activity level or score for the particular channel. The expected noise floor improvement for a channel may be determined based on the current noise floor, the noise floor based on the same BSS traffic, and the predicted off-channel DFS noise floor. For example, the expected noise floor improvement for a channel may be determined by subtracting the noise floor based on the same BSS traffic from the current noise floor. In certain examples, a noise floor improvement of 4 or more decibels (dB) may be considered a high noise floor improvement. The predicted off-channel DFS noise floor may then be added to the result. The current noise floor, the noise floor based on the same BSS traffic, and the predicted off-channel DFS noise floor may be determined by the recommendation engine 122 from the received scan data and/or the stored channel data stored at the network device 116 or the computing device 104.

For example, good DFS usage history for the particular channel by other locations (e.g., a location adjacent to the location of the network device 116) may be used to improve (e.g., reduce) the activity level or score for the particular channel. For example, good DFS usage history of other devices may include the particular channel having been measured or reported to have been used a number of times that satisfies a threshold during a defined period or over a defined number of samples by other locations (e.g. adjacent or nearby networks). For example, a DFS channel that has a strong signal and is a candidate channel for a number of times that satisfies a threshold is a good indicator that radar activity is small on nonexistent on the particular DFS channel. For example, a DFS channel that has a weak signal and is not a candidate channel for a number of times that satisfies a threshold may indicate that radar activity occurs on that channel in the vicinity of the network device 116.

DFS usage history may be determined based on how successfully nearby network devices (e.g., network devices 124a, 124b) have used the particular DFS channel. The determination may be used based on radio frequency sensing from the nearby network devices (e.g., network devices 124a, 124b) or through the use of a geo reference. The DFS usage history for other locations may be determined by the recommendation engine 122 from the received scan data and/or the stored channel data stored at the network device 116 or the computing device 104.

For example, good DFS usage history for the particular channel at the current location (e.g., at the network device 116) may be used to improve (e.g., reduce) the activity level or score for the particular channel. DFS usage history may be determined based on how successfully a network device at the current location (e.g., network device 116) has used the particular DFS channel. For example, good DFS usage history at the current location (e.g., network device 116) may include the network device 116 determining that the particular channel has been measured or used a number of times that satisfies a threshold during a defined period or over a defined number of samples by the network device 116. For example, a DFS channel that has been used a number of times that satisfies a threshold is a good indicator that radar activity is small on nonexistent on the particular DFS channel. For example, a DFS channel that has not been used a number of times that satisfies a threshold may indicate that radar activity occurs on that channel in the vicinity of the network device 116. The DFS usage history for the current location may be determined by the recommendation engine 122 from the received scan data and/or the stored channel data stored at the network device 116 or the computing device 104.

For example, if a channel has a consistent pattern of low or non-usage during a particular time period or time periods, then a scan for usage of that channel on subsequent days during that time period or periods may be used to improve (e.g., reduce) the activity level or score for the particular channel. For example, the channel may be busy due to overlapping networks on the channel but the contribution to the channel's busyness by the current location (e.g., network device 116) is low (e.g., does not satisfy a threshold amount (e.g., 20% contribution to busyness of the channel)). In this example, the adjustment to the activity level for the channel would be small. For example, the channel may be busy and the contribution to the channel's busyness by the current location (e.g., network device 116) may be high (e.g., satisfies a threshold amount (e.g., greater than 50% contribution to the busyness of the channel)). In this example, the adjustment to the activity level for the channel would be greater than the small adjustment to the activity level of the prior example, to reflect that a channel change is more beneficial. The patterns of usage history for the channels may be determined by the recommendation engine 122 from the received scan data and/or the stored channel data stored at the network device 116 or the computing device 104.

For example, if the number of clients identified by the network device (e.g., the network device 116 and/or network devices 124a, 124b) that are DFS-capable satisfies a threshold (e.g., ten), then the large number of DFS-capable clients accessing the network 105 via the network device 116, 124a, and/or 124b may be used to improve (e.g., reduce or reduce by a larger amount) the activity level or score for the particular channel. For example, the adjustment to the activity level or score for the particular channel may be variable. For example, if the number of DFS-capable clients is zero or below a threshold, then the activity level or score may be increased or only decreased a small amount to reflect that a predicted channel move is less beneficial. For example, if the number of DFS-capable clients satisfies a threshold, then the activity level or score may be adjusted (e.g., reduced) a greater amount than the small reduction amount, to reflect that a predicted channel move is more beneficial than when the DFS-capable clients was zero or did not satisfy (e.g., was below) the threshold. The identification of DFS client devices (e.g., user devices) may be determined by the recommendation engine 122 from the received scan data and/or the stored channel data stored at the network device 116 or the computing device 104.

For example, low expected channel utilization improvement for the particular channel may be used to worsen (e.g., increase) the activity level or score for the particular channel. For example, the computing device (e.g., the network device 116 or the computing device 104) may determine an expected channel utilization for the channel based on switching to the channel and may compare the current channel utilization to the expected channel utilization for the channel to determine an amount or level of channel utilization improvement or deterioration. The expected channel utilization for a channel may be determined based on the current on-channel utilization, the channel utilization based on the same BSS traffic, and the predicted off-channel DFS channel utilization. For example, the expected channel utilization for a channel may be determined by subtracting channel utilization based on the same BSS traffic from the current on-channel utilization. The predicted off-channel DFS channel utilization may then be added to the result. The current on-channel utilization, the channel utilization based on the same BSS traffic, and the predicted off-channel DFS channel utilization may be determined by the recommendation engine 122 from the received scan data and/or the stored channel data stored at the network device 116 or the computing device 104.

For example, low expected noise floor improvement for the particular channel may be used to worsen (e.g., increase) the activity level or score for the particular channel. The expected noise floor improvement for a channel may be determined based on the current noise floor, the noise floor based on the same BSS traffic, and the predicted off-channel DFS noise floor. For example, the expected noise floor improvement for a channel may be determined by subtracting the noise floor based on the same BSS traffic from the current noise floor. The predicted off-channel DFS noise floor may then be added to the result. The current noise floor, the noise floor based on the same BSS traffic, and the predicted off-channel DFS noise floor may be determined by the recommendation engine 122 from the received scan data and/or the stored channel data stored at the network device 116 or the computing device 104.

For example, bad or poor DFS usage history for the particular channel by other locations may be used to worsen (e.g., increase) the activity level or score for the particular channel. For example, poor DFS usage history of other devices may include the particular channel having a poor signal or reported to have been used only a few times or a number of times that fails to satisfy a threshold during a defined period or over a defined number of samples by other locations (e.g. adjacent or nearby networks). For example, a DFS channel that has a strong signal and is a candidate channel for a number of times that satisfies a threshold is a good indicator that radar activity is small on nonexistent on the particular DFS channel and may result in the activity level or score being decreased. For example, a DFS channel that has a weak signal and is not a candidate channel for a number of times that satisfies a threshold may indicate that radar activity occurs on that channel in the vicinity of the network device 116 and may result in the activity level or score being increased. DFS usage history may be determined based on how successfully nearby network devices (e.g., network devices 124a, 124b) have used the particular DFS channel. The determination may be used based on radio frequency sensing from the nearby network devices (e.g., network devices 124a, 124b) or through the use of a geo reference. The DFS usage history for other locations may be determined by the recommendation engine 122 from the received scan data and/or the stored channel data stored at the network device 116 or the computing device 104.

For example, bad or poor DFS usage history for the particular channel at the current location (e.g., at the network device 116) may be used to worsen (e.g., increase) the activity level or score for the particular channel. DFS usage history may be determined based on how successfully a network device at the current location (e.g., network device 116) has used the particular DFS channel. The DFS usage history for the current location may be determined by the recommendation engine 122 from the received scan data and/or the stored channel data stored at the network device 116 or the computing device 104. For example, poor DFS usage history at the current location (e.g., network device 116) may include the network device 116 determining that the particular channel has not been measured or not used a number of times that satisfies a threshold during a defined period or over a defined number of samples by the network device 116. For example, a DFS channel that has been used a number of times that does not satisfy a threshold may indicate that radar activity occurs on that channel in the vicinity of the network device 116 and may result in the activity level or score being increased.

For example, if a channel does not have a consistent pattern of low or non-usage during a particular time period or time periods, then a scan for usage of that channel on subsequent days during that time period or periods may be used to worsen (e.g., increase) the activity level or score for the particular channel. The patterns of usage history for the channels may be determined by the recommendation engine 122 from the received scan data and/or the stored channel data that may be stored at the network device 116 or the computing device 104.

For example, if the number of clients identified by the network device (e.g., the network device 116 and/or network devices 124a, 124b) that are DFS-capable does not satisfy a threshold (e.g., ten), then the small number of DFS capable clients accessing the network 105 via the network device 116, 124a, and/or 124b may be used to worsen (e.g., increase or increase by a larger amount) the activity level or score for the particular channel. For example, the adjustment to the activity level or score for the particular channel may be variable. For example, if the number of DFS-capable clients is zero or does not satisfy a threshold number of devices, then the activity level or score may be increased to reflect that a predicted channel move is less beneficial. The identification of DFS client devices (e.g., user devices) may be determined by the recommendation engine 122 from the received scan data and/or the stored channel data stored at the network device 116 or the computing device 104.

At 345, the computing device (e.g., the network device 116) may determine a portion of the channels that are DFS channels as opposed to non-DFS channels in the scanned wireless frequency band. For example, a listing of the DFS channels for one or more wireless frequency bands may be included with stored channel data stored at the network device 116 or the computing device 104. For example, the network device 116 may compare each of the channels in the wireless frequency band to the listing of DFS channels in the stored channel data to determine which channels are DFS channels.

At 350, the computing device (e.g., the network device 116) may determine a portion of the channels that satisfy an activity level threshold or do not satisfy an activity level threshold, depending on how the activity level threshold is assigned. For example, the channels that are evaluated against the activity level threshold may be DFS channels. For example, if the channel has no activity level or a zero or very low (e.g., less than 1) activity score, that may be representative of no activity being identified during the scan of that channel. A lack of activity on a channel may represent an increased likelihood that the particular channel is not a good choice for selection as a network channel. For example, the lack of activity on the channel may represent an increased likelihood that the particular channel is being used for purposes other than networking purposes, such as being used by an active radar system. Being used for this other purpose may prohibit other devices from using the particular channel, thus resulting in the low or zero network activity level. Accordingly, selecting a channel that has a zero or very low activity level for presentation to a user for use may result in a subsequent inability to use that channel due to a detection of other uses of that particular channel (e.g., radar signals during a channel availability check). For example, the network device 116 may determine the portion of the channels that satisfy an activity level threshold based on the activity level or score for each channel. For example, the network device 116 may compare the activity level or score for each channel to the activity level threshold. For example, if the activity level threshold is set at greater than zero and the activity level or score for a channel is greater than the threshold level, then the channel satisfies the activity level threshold and the particular channel may continue to be evaluated (rather than be optionally removed from the listing of available channels) in the listing of available channels for the wireless frequency band. For example, the activity level or score for the channel not satisfying the activity level threshold may indicate that the particular channel is being used for radar telemetry in the particular location.

For example, if the activity level threshold is set at zero and satisfying the activity level threshold is considered to be an activity level or score that is equal to or less than zero, (e.g., channels that should no longer be evaluated satisfy the threshold) then, if the activity level or score for the channel is greater than zero, then the channel satisfies the activity level threshold and the particular channel may continue to be evaluated (rather than be optionally removed from the listing of available channels) in the listing of available channels for the wireless frequency band. For example, the activity level or score for the channel satisfying the activity level threshold may indicate that the particular channel is being used for radar telemetry in the particular location.

For example, the network device 116 may determine a portion of the channels that are DFS channels and may compare the activity level or score (e.g., the initial activity level or score or the adjusted activity level or score) of each DFS channel to a activity level threshold to determine if the DFS channel satisfies the activity level threshold. For example, DFS channels with zero or very little activity level or score may be less desirable as a channel option for use by the network device 116 than DFS channels with a moderate activity level or score that satisfies and activity level threshold, because the DFS channel with zero or very little activity level may be an indicator that the particular DFS channel is being used for radar telemetry in the location of the network device 116. For example, if the DFS channel does not satisfy the activity level threshold, the network device 116 or the computing device 104 may remove the DFS channel from the listing of available channels for the wireless frequency band.

In an alternative example, the activity level or score of each DFS channel may be compared to an activity level threshold, and those DFS channels that do not satisfy the activity level threshold (or satisfy a activity level threshold, depending on how the activity level threshold is assigned) may be removed from the listing of available channels for the wireless frequency band. For example, if the activity level threshold is set at greater than zero and the activity level or score for a DFS channel is less than the threshold level, then the DFS channel does not satisfy the activity level threshold and the particular DFS channel may be removed from the listing of available channels for the wireless frequency band. For example, if the activity level threshold is set at zero, satisfying the activity level threshold is considered to be an activity level or score that is equal to or less than zero, and the activity level or score for the DFS channel is zero, then the DFS channel satisfies the activity level threshold and the particular DFS channel may be removed from the listing of available channels for the wireless frequency band.

At 355, the computing device (e.g., the network device 116) may rank or list the channels of the wireless frequency band that remain in the listing of channels (e.g., have not been removed based on the activity level or score for each channel (e.g., the initial activity level or score for each channel or the adjusted activity level or score for one or more of the channels)). For example, the network device 116 may rank or list the channels in order of activity level or score. For example, the network device may rank or list the channels from lowest activity level or score to highest activity level or score, with the channels having the lowest activity level or score being favored. For example, the rank or list may include both DFS and non-DFS channels.

At 360, the computing device (e.g., the network device 116) may adjust the ranking position of one or more of the scanned channels of the wireless frequency band based on the historical DFS scan data for that particular channel. For example, if a scanned channel was previously determined to have radar activity thereon, based on the historical DFS channel scan data, the overall ranking of that particular wireless channel may be lowered and/or removed completely from the ranking. For example, if a scanned channel was previously determined to not have radar activity thereon, based on the historical DFS channel scan data, the overall ranking of that particular wireless channel may be raised or placed at the top of the ranking.

At 365, the computing device (e.g., the network device 116) may determine the highest ranking channel. The determination may be made based on the ranking of the channels. For example, the network device 116 may select the first channel in the ranking. For example, the highest ranking DFS channel may be the DFS channel with the lowest activity level or score that represents at least a minimal amount of activity on the DFS channel (e.g., a non-zero activity level or score). For example, the highest ranking non-DFS channel may be the non-DFS channel with the lowest activity level or score, including a zero activity level or score. For example, the highest ranking channel may be a DFS or non-DFS channel. For example, in situations where the ranking is inverted (e.g., highest activity level or score to lowest activity level or score), the determination may be as to the lowest ranking channel and the network device 116 may select the last channel in the ranking.

At 370, a determination may be made as to whether the selected channel (e.g., the highest ranking channel and/or channel with the lowest activity level or score (e.g., lowest non-zero activity level or score for DFS channels) is a DFS channel or a non-DFS channel. For example the determination may be made by a computing device (e.g., the network device 116). For example, a listing of the DFS channels and/or non-DFS channels for one or more wireless frequency bands may be included with stored channel data stored at the network device 116 or the computing device 104. For example, the network device 116 may compare the selected channel to the listing of DFS and/or non-DFS channels for the wireless frequency band in the stored channel data to determine if the channel is a DFS channel or a non-DFS channel.

At 375, if the selected channel is a particular type of channel (e.g., a DFS channel), a channel availability check may be completed for the selected channel. For example, the channel availability check may be executed by the computing device (e.g., the network device 116). In a channel availability check, a network device (e.g., network device 116) may conduct a scan of the selected channel for a preset time period to determine if any radar in proximity (e.g., radar station 202) is using the selected DFS channel. For example, the preset period of time may be any amount of time between 1-10 minutes. For example, the preset period of time may be one minute for a 20 MHz channel, two minutes for a 40 MHz channel, four minutes for an 80 MHz channel, and 8 minutes for a 160 MHz channel. If the network device 116 detects that a radar station 202 is using the selected DFS channel, then the network device 116 may exclude that channel from the list of available channels for an exclusion time period. For example, the exclusion time period may be 30 minutes. After the conclusion of the exclusion time period, the selected channel may be added back into the list of available channels that may be evaluated to determine activity level.

At 380, an inquiry may be conducted to determine if at least one radar signal is received by the computing device (e.g., the network device 116) while scanning the channel for the preset time period. At 385, if a radar signal is received by the network device 116 while completing the channel availability check, the selected channel may be removed from the ranking or listing of channels or otherwise designated as not available for use. The network device 116 may determine the next highest channel in the ranking (e.g., the channel with the next lowest activity level or score) for analysis.

At 390, if no radar signals are received by the network device 116 during the channel availability check or the highest ranking channel (e.g., the channel with the lowest activity level or score) is a non-DFS channel, an indication of the channel may be sent to the user device 102. For example, the computing device (e.g., the network device 116) may send data to the user device 102 indicating the selected channel for use. The data may facilitate the display of the selected channel on a display of the user device 102. The data may also include all or a portion of the ranking of the channels. The data may also include a ranking of only non-DFS channels from lowest activity level or score to highest activity level or score. The data may also include a ranking of only DFS channels from lowest activity level or score to highest activity level or score. For example, channel availability checks may have been completed by the network device 116 for each of the ranked DFS channels in the data and a determination made that radar signals were not received for each of those DFS channels during the channel availability check. The data may also include the recommended channel width (e.g., 20 MHz, 40 MHz, 80 MHz, or 160 MHz) for the selected channel and/or each ranked channel.

Figure 4:
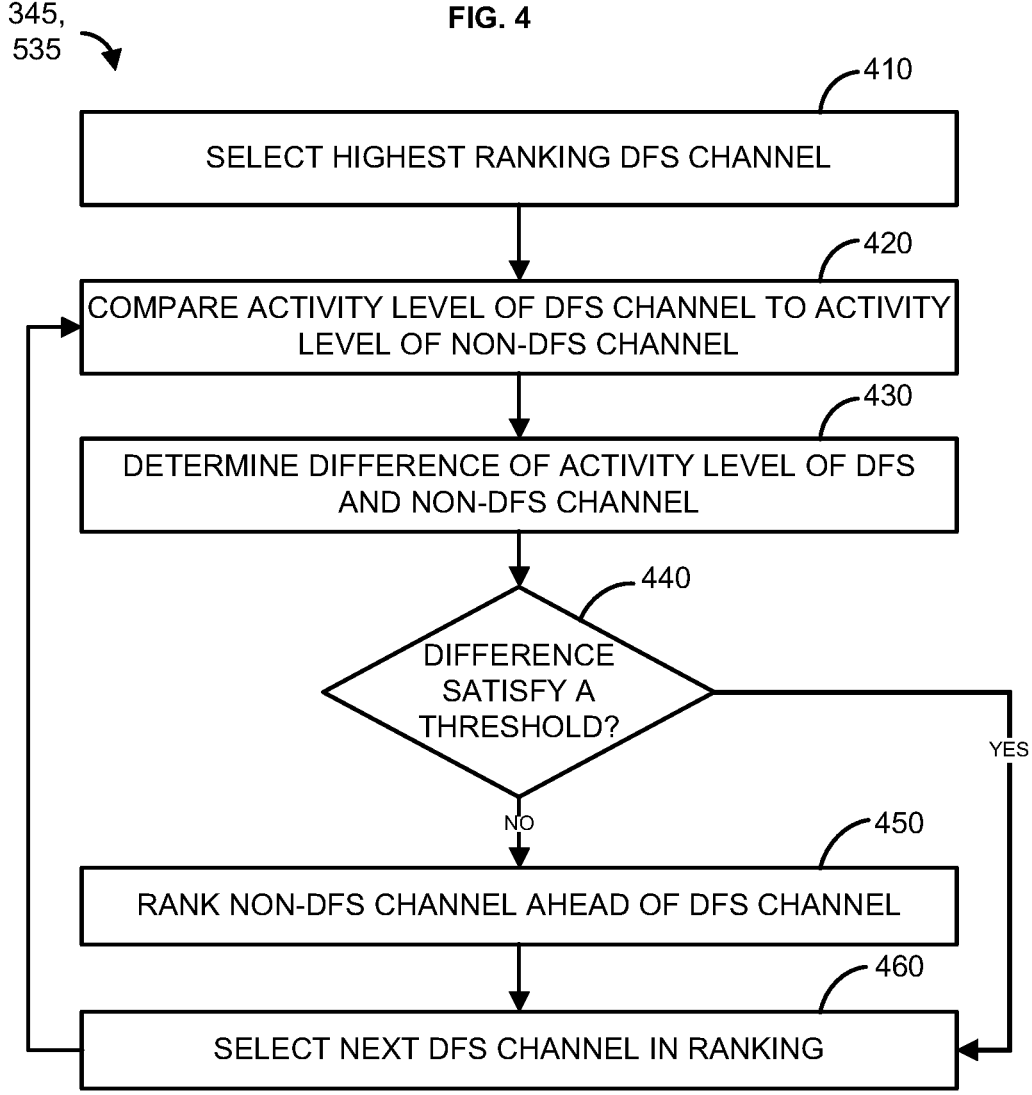
FIG. 4 shows a flowchart of an example method for ranking available network channels.

FIG. 4 is a flowchart of an example method 345, 535 for generating a ranking of channels according to activity level. For example, a computing device (e.g., the computing device 104 or the network device 116 may be configured to generate the ranking of the channels according to activity levels or scores. For example the computing device 104 or network device 116 may generate a ranking or listing of channels based solely on the activity level or score. For example, the computing device 104 or network device may adjust the ranking based on how close the activity level or score is of one channel to another and/or based on the type of channel (e.g., DFS or non-DFS). For example, a DFS channel may have a lower (e.g., better) activity level or score and thus, a higher ranking than a non-DFS channel. However, if the activity level or score of the non-DFS channel is within a difference threshold to the activity level or score of the DFS channel, the ranking may be adjusted by the computing device 104 or the network device 116 to move the non-DFS channel higher in the ranking than the DFS channel to potentially offset the risk of radar detection that may occur with the selection of a DFS channel.

At 410, a computing device (e.g., the computing device 104 or the network device 116) may select the highest ranking DFS channel in an initial ranking or listing of channels for the wireless frequency band. For example, the initial ranking or listing of channels may be generated based on the actual activity level or score for each channel and may be ranked from lowest activity level or score down to highest activity level or score, such the channel with the lowest activity level or score has the highest rank. For example, the computing device 104 or the network device 116 may determine which channels are DFS channels based on the listing of the DFS channels for the wireless frequency band included with stored channel data stored at the network device 116 or the computing device 104.

At 420, the computing device (e.g., the computing device 104 or the network device 116) may determine the next highest ranking non-DFS channel in the ranking or listing and may compare the activity level or score of the DFS channel to the activity level or score of the non-DFS channel. For example, the computing device 104 or the network device 116 may determine which channels are non-DFS channels based on the listing of the non-DFS channels for the wireless frequency band included with stored channel data stored at the network device 116 or the computing device 104.

At 430, the computing device (e.g., the computing device 104 or the network device 116) may determine a difference (e.g., an amount of different or a percentage difference) between the activity level or score for the DFS channel and the activity level or score of the non-DFS channel. For example, the computing device 104 or the network device 116 may determine a difference of activity level by subtracting the activity level or score of the non-DFS channel from the activity level or score of the DFS channel. For example, the computing device 104 or the network device 116 may determine a percentage difference by taking the quotient of the difference of activity level divided by the activity level or score of the DFS channel.

At 440, a determination may be made if the difference or percentage difference satisfies a threshold difference or threshold percentage difference. For example, the determination may be made by the computing device (e.g., the computing device 104 or the network device 116). For example, the computing device 104 or the network device 116 may compare the difference of activity level to a threshold difference. If the difference of activity level satisfies the threshold difference (e.g., equals or is greater than the threshold difference), then the threshold difference may be considered to be satisfied and the YES branch may be followed. Alternatively, the NO branch may be followed. For example, the computing device 104 or the network device 116 may compare the percentage difference to the threshold percentage difference. If the percentage difference satisfies the threshold percentage difference (e.g., equals or is greater than the threshold percentage difference), then the threshold percentage difference may be considered to be satisfied and the YES branch may be followed. Alternatively, the NO branch may be followed.

At 450, if the difference or percentage difference threshold is not satisfied, the computing device (e.g., the computing device 104 or the network device 116) may adjust the ranking of channels by placing the evaluated non-DFS channel higher in the ranking than the evaluated DFS channel. At 460, the computing device 104 or the network device 116 may select the next DFS channel in the ranking for comparison to a closely ranked non-DFS channel.

Figure 5:
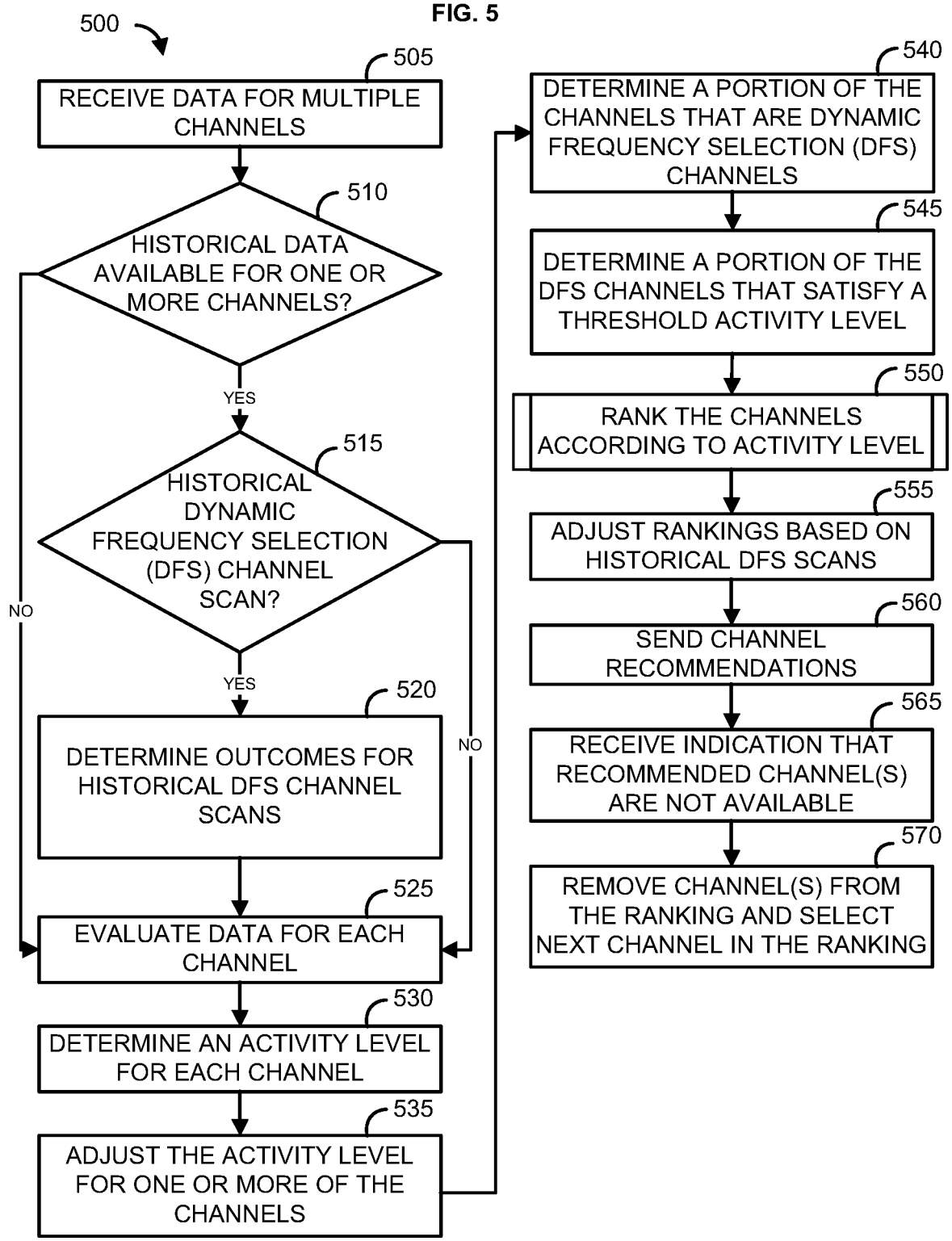
FIG. 5 shows a flowchart of an example method for identifying a network channel for use.

FIG. 5 is a flowchart of an example method 500 for identifying a network channel for use in a wireless network by a network device (e.g., the network device 116) and a user device (e.g., the user device 102). For example, the network device 116 may have recently booted up or been rebooted. For example, the user device 102 may alternatively have been communicably connected to the network 105, such as a local area network (LAN), a general wide area network (WAN), and/or the Internet, via the network device 116 using a first wireless channel. The first wireless channel may no longer be operating or operating properly (e.g., latency issues, dropping out). A computing device (e.g., the computing device 104) communicably coupled to the network device 116 (e.g., via the network 105) may evaluate one or more channels in one or more wireless frequency bands (e.g., 5 GHz, 2.4 GHz, etc.). The network device 116 and/or computing device 104 may determine, based on the evaluation, which channel or channels to recommend for use by the network device 116 for network communications with the user device 102.

At 505, the computing device (e.g., the computing device 104) may receive scan data for each wireless channel scanned in the one or more wireless frequency bands. For example, the scan data may be received from a network device (e.g., the network device 116, such as a gateway, router, access point, node, etc.). For example, the network device 116 may passively scan each available channel in one or more wireless frequency bands. For example, one of the one or more wireless frequency bands may be a 5 gigahertz (GHz) band, and each available wireless channel may be 20 megahertz, 40 MHz, 80 MHz, or 160 MHz, within the 5 GHz band. For example, one of the one or more wireless frequency bands may be a 2.4 GHz band, a 3.6 GHz band, a 4.9 GHz band, a 5.9 GHz band, or another frequency band now known or hereinafter developed). For example, the computing device 104 may receive local Wi-Fi airtime utilization data for each channel scanned in the wireless frequency band by the network device 116. For example, the local Wi-Fi airtime utilization data for each channel scanned may include a number of overlapping basic service sets (OBSS) heard, a channel utilization per OBSS, a channel utilization per channel, a presence of P20, S20, S40low, and/or S40high. The received scan data may be transmitted or sent to a recommendation engine (e.g., the recommendation engine 120) or another processing software for analysis. In certain examples, the transmission is an internal transmission within the computing device 104. In other examples, the received scan data may be transmitted or sent from the computing device 104 to another computing device for analysis.

At 510, a determination may be made as to whether historical data is available related to DFS channel usage for each of the wireless channels that have been scanned. For example, the computing device (e.g., the computing device 104) may compare each wireless channel scanned to historical information for each of the wireless channels scanned in the frequency band. For example, the computing device 104 may determine if historical information related to DFS channel usage for each of the wireless channels is available. The computing device 104 may receive DFS channel usage information and statistics from other computing devices (e.g., one or more of the network device 116, 124a, 124b) and may store this historical information in memory in, for example, the recommendation engine 120. The historical information may provide information related to the success or lack of success of using a DFS channel (e.g., was radar activity detected on the particular DFS channel). For example, the historical information may include an indication of whether the wireless channel is a DFS channel, whether the wireless channel is being used for radar, and/or whether the wireless channel has previously been successfully used for communication (e.g., no radar signal detected prior to use). The historical information for each channel may be time-limited. For example, the historical information for each channel may only be stored for a predetermined period of time, such as one week, one month, two months, six months, one year, or any other time period desired. Limiting the storage of the historical information for each wireless channel may provide more up-to-date information about each wireless channel. Obtaining historical information about the wireless channels being evaluated may reduce the time and usage needs from the computing device 104. If no historical information for the one or more wireless channels is available at the computing device 104, then the NO branch may be followed to 525. If historical information for one or more of the wireless channels that have been scanned is available, the YES branch may be followed to 515.

At 515, a determination may be made as to whether the available historical data for the scanned wireless channels of the computing device (e.g., the network device 116) includes historical DFS channel scan data. The historical DFS channel scan data may have been provided by the network device 116 or another computing device (e.g., network devices 124a, 124b). The determination may be made by the computing device (e.g., the computing device 104). The historical DFS channel scan data may include an indication of whether the particular wireless channel was available or unavailable for use by a network device and/or whether radar activity was previously detected on the particular wireless channel. If historical DFS channel scan data is not available for one or more of the wireless channels scanned by the network device 116, the NO branch may be followed to 525. If historical DFS channel scan data is available for one or more of the wireless channels scanned by the network device 116, the YES branch may be followed to 520.

At 520, the computing device (e.g., the computing device 104) may determine or evaluate the outcomes of the historical DFS channels scans available for the one or more wireless channels scanned by the network device 116. For example, the computing device 104 may determine if radar activity was previously detected on one or more of the wireless channels scanned, based on the available historical data. In certain examples, the network device modify the rankings of the one or more channels for which historical DFS channel scan data is available. For example, if a scanned channel was previously determined to have radar activity thereon, based on the historical DFS channel scan data, the overall ranking of that particular wireless channel may be lowered and/or removed completely from the ranking discussed in 550. For example, if a scanned channel was previously determined to not have radar activity thereon, based on the historical DFS channel scan data, the overall ranking of that particular wireless channel may be raised or immediately selected for recommendation. For example, if all of the scanned DFS channels were previously determined to have radar activity thereon, the network device 116 may determine to not attempt to use a DFS channel and may immediately select a non-DFS channel for recommendation.

At 525, the computing device (e.g., the recommendation engine 120 of the computing device 104) may evaluate the received data for each channel to determine an activity level, or how quiet, each channel is. For example, the activity level for each channel may be determined based on the channel utilization and/or the number of OBSS for each channel from the received channel data. For example, the channel utilization for each channel may be compared to a threshold value to indicate if the particular channel has a high or low activity level. For example, the activity level for each channel may be additionally or alternatively determined based on the number of beacons heard by the channel. For example, the number of beacons heard may be compared to a threshold number of beacons heard to indicate if the particular channel has a higher or lower activity level. For example, the activity level for each channel may be additionally or alternatively determined based on the number of beacons heard by the channel that are above or below a receiver power threshold (e.g., received signal strength indicator (RSSI) or received channel power indicator (RCPI)). For example, the activity level for each channel may be additionally or alternatively determined based on the number of frames overheard that are outside of the basic service set (BSS) as compared to a threshold value of overheard frames to indicate if the particular channel has a higher or lower activity level.

At 530, the computing device (e.g., the recommendation engine 120 of the computing device 104) may determine an activity level or score for each channel. For example, the activity level may be a score or numerical indicator of the activity level and/or busyness of the particular channel. For example, the activity level or score may be determined based on at least a portion of the received scan data for each of the channels in the wireless frequency band. For example, the activity level may be determine based on one or more of number of OBSS heard by the channel, the channel utilization for the channel, the number of beacons heard on the channel, the RSSI, the RCPI, the number of frames heard that are outside the BSS. For example, other scan data for the channel may be used in addition to or in the alternative for any of the other scan data listed. For example, if only non-DFS channels are scanned by the network device 116, then the recommendation engine 120 may only determine an activity level for each of the non-DFS channels in the wireless frequency band. In this example, the recommendation engine 120 may, for each of the DFS channels in the wireless frequency band, which have not been scanned or for which scan data has not been received, determine that each DFS channel has a lower activity level/score than the non-DFS channel with the lowest activity level/score.

At 535, the computing device (e.g., the recommendation engine 120 of the computing device 104) may adjust the activity level or score for one or more of the channels for which scan data was received. For example, certain scan data and/or historical data for a channel may be used to increase or decrease the channel's activity level or score. For example, high expected channel utilization improvement for the particular channel may be used to improve (e.g., reduce) the activity level or score for the particular channel. The expected channel utilization for a channel may be determined based on the current on-channel utilization, the channel utilization based on the same BSS traffic, and the predicted off-channel DFS channel utilization. For example, the expected channel utilization for a channel may be determined by subtracting channel utilization based on the same BSS traffic from the current on-channel utilization. The predicted off-channel DFS channel utilization may then be added to the result. The current on-channel utilization, the channel utilization based on the same BSS traffic, and the predicted off-channel DFS channel utilization may be determined by the recommendation engine 120 from the received scan data and/or the stored channel data stored at the network device 116 or the computing device 104.

For example, high expected noise floor improvement for the particular channel may be used to improve (e.g., reduce) the activity level or score for the particular channel. The expected noise floor improvement for a channel may be determined based on the current noise floor, the noise floor based on the same BSS traffic, and the predicted off-channel DFS noise floor. For example, the expected noise floor improvement for a channel may be determined by subtracting the noise floor based on the same BSS traffic from the current noise floor. The predicted off-channel DFS noise floor may then be added to the result. The current noise floor, the noise floor based on the same BSS traffic, and the predicted off-channel DFS noise floor may be determined by the recommendation engine 120 from the received scan data and/or the stored channel data stored at the network device 116 or the computing device 104.

For example, good DFS usage history for the particular channel by other locations (e.g., a location adjacent to the current location of the network device 116) may be used to improve (e.g., reduce) the activity level or score for the particular channel. DFS usage history may be determined based on how successfully nearby network devices (e.g., network devices 124a, 124b) have used the particular DFS channel. The determination may be used based on radio frequency sensing from the nearby network devices (e.g., network devices 124a, 124b) or through the use of a geo reference. The DFS usage history for other locations may be determined by the recommendation engine 120 from the received scan data and/or the stored channel data stored at the network device 116 or the computing device 104.

For example, good DFS usage history for the particular channel at the current location (e.g., at the network device 116) may be used to improve (e.g., reduce) the activity level or score for the particular channel. DFS usage history may be determined based on how successfully a network device at the current location (e.g., network device 116) has used the particular DFS channel. The DFS usage history for the current location may be determined by the recommendation engine 120 from the received scan data and/or the stored channel data stored at the network device 116 or the computing device 104.

For example, if a channel has a consistent pattern of low or non-usage during a particular time period or time periods, then a scan for usage of that channel on subsequent days during that time period or periods may be used to improve (e.g., reduce) the activity level or score for the particular channel. The patterns of usage history for the channels may be determined by the recommendation engine 120 from the received scan data and/or the stored channel data stored at the network device 116 or the computing device 104.

For example, if the number of clients identified by the network device (e.g., the network device 116 and/or network devices 124a, 124b) that are non-DFS capable is zero and/or satisfies a threshold (e.g., less than ten), then the absence or low number of non-DFS capable clients accessing the network 105 via the network device 116, 124a, and/or 124b may be used to improve (e.g., reduce) the activity level or score for the particular channel. The identification of non-DFS client devices (e.g., user devices) may be determined by the recommendation engine 120 from the received scan data and/or the stored channel data stored at the network device 116 or the computing device 104.

For example, low expected channel utilization improvement for the particular channel may be used to worsen (e.g., increase) the activity level or score for the particular channel. The expected channel utilization for a channel may be determined based on the current on-channel utilization, the channel utilization based on the same BSS traffic, and the predicted off-channel DFS channel utilization. For example, the expected channel utilization for a channel may be determined by subtracting channel utilization based on the same BSS traffic from the current on-channel utilization. The predicted off-channel DFS channel utilization may then be added to the result. The current on-channel utilization, the channel utilization based on the same BSS traffic, and the predicted off-channel DFS channel utilization may be determined by the recommendation engine 120 from the received scan data and/or the stored channel data stored at the network device 116 or the computing device 104.

For example, low expected noise floor improvement for the particular channel may be used to worsen (e.g., increase) the activity level or score for the particular channel. The expected noise floor improvement for a channel may be determined based on the current noise floor, the noise floor based on the same BSS traffic, and the predicted off-channel DFS noise floor. For example, the expected noise floor improvement for a channel may be determined by subtracting the noise floor based on the same BSS traffic from the current noise floor. The predicted off-channel DFS noise floor may then be added to the result. The current noise floor, the noise floor based on the same BSS traffic, and the predicted off-channel DFS noise floor may be determined by the recommendation engine 120 from the received scan data and/or the stored channel data stored at the network device 116 or the computing device 104.

For example, bad or poor DFS usage history for the particular channel by other locations may be used to worsen (e.g., increase) the activity level or score for the particular channel. DFS usage history may be determined based on how successfully nearby network devices (e.g., network devices 124a, 124b) have used the particular DFS channel. The determination may be used based on radio frequency sensing from the nearby network devices (e.g., network devices 124a, 124b) or through the use of a geo reference. The DFS usage history for other locations may be determined by the recommendation engine 120 from the received scan data and/or the stored channel data stored at the network device 116 or the computing device 104.

For example, bad or poor DFS usage history for the particular channel at the current location (e.g., at the network device 116) may be used to worsen (e.g., increase) the activity level or score for the particular channel. DFS usage history may be determined based on how successfully a network device at the current location (e.g., network device 116) has used the particular DFS channel. The DFS usage history for the current location may be determined by the recommendation engine 120 from the received scan data and/or the stored channel data stored at the network device 116 or the computing device 104.

For example, if a channel does not have a consistent pattern of low or non-usage during a particular time period or time periods, then a scan for usage of that channel on subsequent days during that time period or periods may be used to worsen (e.g., increase) the activity level or score for the particular channel. The patterns of usage history for the channels may be determined by the recommendation engine 120 from the received scan data and/or the stored channel data stored at the network device 116 or the computing device 104.

For example, if the number of clients identified by the network device (e.g., the network device 116 and/or network devices 124a, 124b) that are non-DFS capable is high and/or satisfies a threshold (e.g., more than ten), then the high number of non-DFS capable clients accessing the network 105 via the network device 116, 124a, and/or 124b may be used to worsen (e.g., increase) the activity level or score for the particular channel. The identification of non-DFS client devices (e.g., user devices) may be determined by the recommendation engine 120 from the received scan data and/or the stored channel data stored at the network device 116 or the computing device 104.

At 540, the computing device (e.g., the computing device 104) may determine a portion of the channels that are DFS channels as opposed to non-DFS channels in the scanned wireless frequency band. For example, a listing of the DFS channels for one or more wireless frequency bands may be included with stored channel data stored at the network device 116 or the computing device 104. For example, the computing device 104 may compare each of the channels in the wireless frequency band to the listing of DFS channels in the stored channel data to determine which channels are DFS channels.

At 545, the computing device (e.g., the network device 116) may determine a portion of the channels that satisfy an activity level threshold or do not satisfy an activity level threshold, depending on how the activity level threshold is assigned. For example, if the channel has no activity level or a zero or very low (e.g., less than 1) activity score, that may be representative of no activity being identified during the scan of that channel. A lack of activity on a channel may represent an increased likelihood that the particular channel is being used for another purpose, such as a non-network purpose (e.g., by an active radar system, which would prohibit other devices from using the particular channel). Accordingly, selecting a channel that has a zero or very low activity level for presentation to a user for use may result in a subsequent inability to use that channel due to a detection of radar signals during a channel availability check. For example, the network device 116 may determine the portion of the channels that satisfy an activity level threshold based on the activity level or score for each channel. For example, the network device 116 may compare the activity level or score for each channel to the activity level threshold. For example, if the activity level threshold is set at greater than zero and the activity level or score for a channel is greater than the threshold level, then the channel satisfies the activity level threshold and the particular channel may continue to be evaluated (rather than be optionally removed from the listing of available channels) in the listing of available channels for the wireless frequency band. For example, the activity level or score for the channel not satisfying the activity level threshold may indicate that the particular channel is being used for radar telemetry in the particular location.

For example, if the activity level threshold is set at zero and satisfying the activity level threshold is considered to be an activity level or score that is equal to or less than zero, (e.g., channels that should no longer be evaluated satisfy the threshold) then, if the activity level or score for the channel is greater than zero, then the channel satisfies the activity level threshold and the particular channel may continue to be evaluated (rather than be optionally removed from the listing of available channels) in the listing of available channels for the wireless frequency band. For example, the activity level or score for the channel satisfying the activity level threshold may indicate that the particular channel is being used for radar telemetry in the particular location.

For example, the network device 116 may determine a portion of the channels that are DFS channels and may compare the activity level or score (e.g., the initial activity level or score or the adjusted activity level or score) of each DFS channel to a activity level threshold to determine if the DFS channel satisfies the activity level threshold. For example, DFS channels with zero or very little activity level or score may be less desirable as a channel option for use by the network device 116 than DFS channels with a moderate activity level or score that satisfy an activity level threshold, because the DFS channel with zero or very little activity level may be an indicator that the particular DFS channel is being used for radar telemetry in the location of the network device 116. For example, if the DFS channel does not satisfy the activity level threshold, the network device 116 or the computing device 104 may remove the DFS channel from the listing of available channels for the wireless frequency band.

In an alternative example, the activity level or score of each DFS channel may be compared to an activity level threshold, and those DFS channels that do not satisfy the activity level threshold (or satisfy a activity level threshold, depending on how the activity level threshold is assigned) may be removed from the listing of available channels for the wireless frequency band. For example, if the activity level threshold is set at greater than zero and the activity level or score for a DFS channel is less than the threshold level, then the DFS channel does not satisfy the activity level threshold and the particular DFS channel may be removed from the listing of available channels for the wireless frequency band. For example, if the activity level threshold is set at zero, satisfying the activity level threshold is considered to be an activity level or score that is equal to or less than zero, and the activity level or score for the DFS channel is zero, then the DFS channel satisfies the activity level threshold and the particular DFS channel may be removed from the listing of available channels for the wireless frequency band.

At 550, the computing device (e.g., the computing device 104) may rank or list the channels of the wireless frequency band that remain in the listing of channels (e.g., have not been removed based on the activity level or score for each channel (e.g., the initial activity level or score for each channel or the adjusted activity level or score for one or more of the channels)). For example, the network device may rank or list the channels in order of activity level or score (e.g., the initial activity level or score for each channel or the adjusted activity level or score for one or more of the channels). For example, the network device may rank or list the channels from lowest activity level or score to highest activity level or score, with the channels having the lowest activity level or score being favored. For example, the rank or list may include both DFS and non-DFS channels.

At 555, the computing device (e.g., the computing device 104) may adjust the ranking position of one or more of the scanned channels of the wireless frequency band based on the historical DFS scan data for that particular channel. For example, if a scanned channel was previously determined to have radar activity thereon, based on the historical DFS channel scan data, the overall ranking of that particular wireless channel may be lowered and/or removed completely from the ranking. For example, if a scanned channel was previously determined to not have radar activity thereon, based on the historical DFS channel scan data, the overall ranking of that particular wireless channel may be raised or placed at the top of the ranking.

At 560, the computing device (e.g., the computing device 104) may determine the highest ranking channel and send an indication of the highest ranking channel to a network device (e.g., the network device 116) for a channel availability check at the network device 116. The determination of the highest ranking channel may be made based on the ranking of the channels. For example, the network device 116 may select the first channel in the ranking. For example, the highest ranking DFS channel may be the DFS channel with the lowest activity level or score that represents at least a minimal amount of activity on the DFS channel (e.g., a non-zero activity level or score). For example, the highest ranking non-DFS channel may be the non-DFS channel with the lowest activity level or score, including a zero activity level or score. For example, the highest ranking channel may be a DFS or non-DFS channel. For example, in situations where the ranking is inverted (e.g., highest activity level or score to lowest activity level or score), the determination may be as to the lowest ranking channel and the network device 116 may select the last channel in the ranking. For example, the computing device 104 may send all or a portion of the ranking of the channels to the network device 116 so that the network device 116 may determine DFS versus non-DFS channels and conduct any channel availability checks that may be needed.

At 565, the computing device (e.g., the computing device 104) may receive an indication that one or more of the recommended channels are not available. For example, the indication may be received from a network device (e.g., the network device 116). The indication may be received base on the network device 116 conducting a channel availability check for the one or more recommended channels and based on the network device 116 receiving a radar signal (e.g., from a radar station 202) on a channel during the channel availability check scan for the one or more recommended channels.

At 570, the computing device (e.g., the computing device 104) may remove the selected channel from the ranking or listing of channels or otherwise designate the channel or channels as not available for use. The computing device 104 may determine the next highest channel in the ranking (e.g., the channel with the next lowest activity level or score) for analysis and send an indication of that channel to the network device 116.

Figure 6:
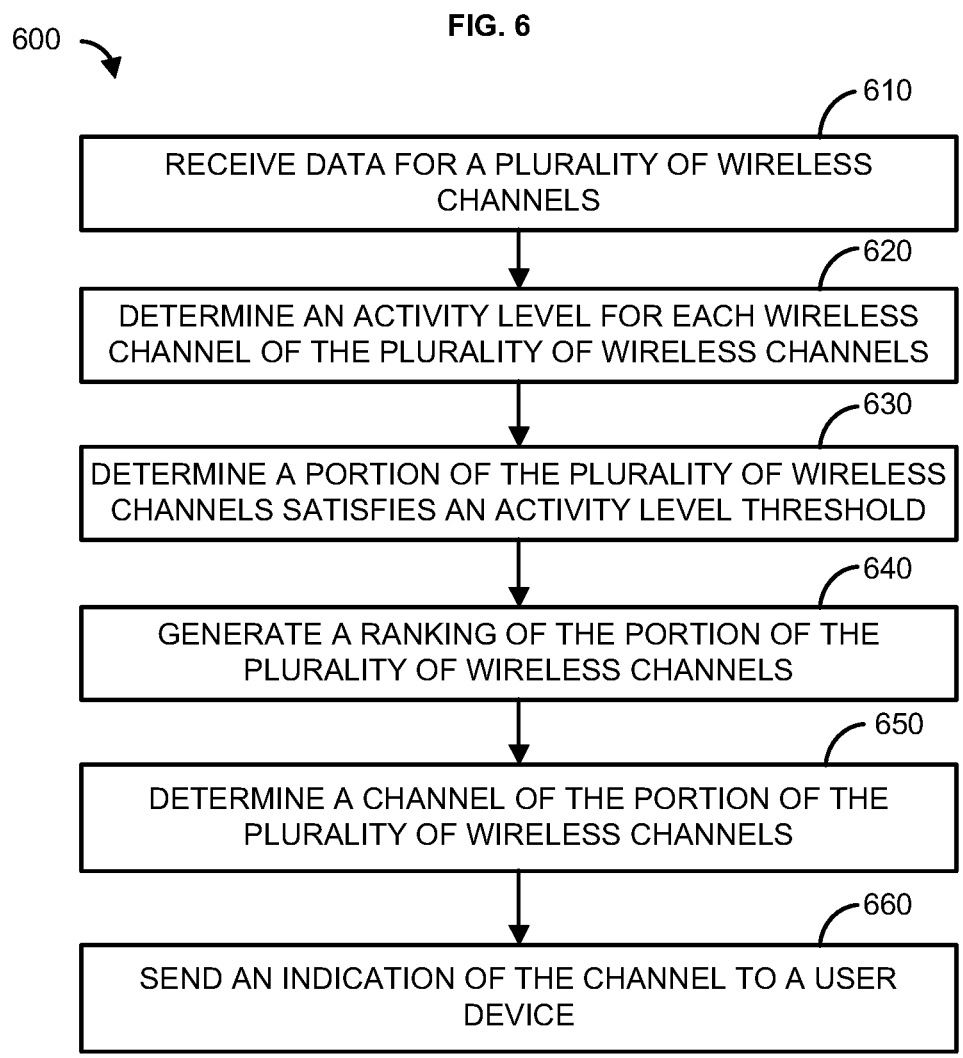
FIG. 6 shows a flowchart of an example method for identifying a network channel for use.

FIG. 6 is a flowchart of an example method 600 for identifying a network channel for use in a wireless network. For example, the network device 116 may have recently booted up or been rebooted. For example, the user device 102 may alternatively have been communicably connected to the network 105, such as a local area network (LAN), a general wide area network (WAN), and/or the Internet, via the network device 116 using a first wireless channel. The first wireless channel may no longer be operating or operating properly (e.g., latency issues, dropping out). A computing device (e.g., the computing device 104) communicably coupled to the network device 116 (e.g., via the network 105) may evaluate one or more channels in one or more wireless frequency bands (e.g., 5 GHz, 2.4 GHz, etc.). The network device 116 and/or computing device 104 may determine, based on the evaluation, which channel or channels to recommend for use by the network device 116 for network communications with the user device 102.

At 610, a computing device (e.g., the computing device 104 or the network device 116) may receive scan data for each wireless channel scanned in the one or more wireless frequency bands. For example, the scan data may be received from a network device (e.g., the network device 116, such as a gateway, router, access point, node, etc.). For example, the network device 116 may passively scan each available channel in one or more wireless frequency bands. For example, one of the one or more wireless frequency bands may be a 5 gigahertz (GHz) band, and each available wireless channel may be 20 megahertz, 40 MHz, 80 MHz, or 160 MHz, within the 5 GHz band. For example, one of the one or more wireless frequency bands may be a 2.4 GHz band, a 3.6 GHz band, a 4.9 GHz band, a 5.9 GHz band, or another frequency band now known or hereinafter developed). For example, the computing device 104 may receive local Wi-Fi airtime utilization data for each channel scanned in the wireless frequency band by the network device 116. For example, the local Wi-Fi airtime utilization data for each channel scanned may include a number of overlapping basic service sets (OBSS) heard, a channel utilization per OBSS, a channel utilization per channel, a presence of P20, S20, S40low, and/or S40high. The received scan data may be transmitted or sent to a recommendation engine (e.g., the recommendation engine 120) or another processing software for analysis. In certain examples, the transmission is an internal transmission within the computing device 104. In other examples, the received scan data may be transmitted or sent from the computing device 104 to another computing device for analysis.

At 620, the computing device (e.g., the recommendation engine 120 of the computing device 104 or the network device 116) may determine an activity level or score for each channel. For example, the activity level may be a score or numerical indicator of the activity level and/or busyness of the particular channel. For example, the activity level or score may be determined based on at least a portion of the received scan data for each of the channels in the wireless frequency band. For example, the activity level may be determine based on one or more of number of OBSS heard by the channel, the channel utilization for the channel, the number of beacons heard on the channel, the RSSI, the RCPI, the number of frames heard that are outside the BSS. For example, other scan data for the channel may be used in addition to or in the alternative for any of the other scan data listed. For example, if only non-DFS channels are scanned by the network device 116, then the recommendation engine 120 may only determine an activity level for each of the non-DFS channels in the one or more wireless frequency bands. In this example, the recommendation engine 120 may, for each of the DFS channels in the wireless frequency band, which have not been scanned or for which scan data has not been received, determine that each DFS channel has a lower activity level/score than the non-DFS channel with the lowest activity level/score.

At 630, the computing device (e.g., computing device 104 or the network device 116) may determine a portion of the plurality of wireless channels that satisfy an activity level threshold or do not satisfy an activity level threshold, depending on how the activity level threshold is assigned. For example, the computing device 104 may determine the portion of the plurality of wireless channels that satisfy the activity level threshold or do not satisfy the activity level threshold based on the activity level or score for each wireless channel of the plurality of wireless channels. For example, the computing device 104 may compare the activity level or score for each wireless channel (or a portion thereof (e.g., DFS channels)) of the plurality of wireless channels to the activity level threshold to determine if the particular wireless channel satisfies the activity level threshold. For example, the plurality of wireless channels may be one or more of DFS channels or non-DFS channels.

For example, if the channel has no activity level or a zero or very low (e.g., less than 1) activity score, that may be representative of no activity being identified during the scan of that channel. A lack of activity on a channel may represent an increased likelihood that the particular channel is being used for another purpose, such as a non-network purpose (e.g., by an active radar system, which would prohibit other devices from using the particular channel). Accordingly, selecting a channel that has a zero or very low activity level for presentation to a user for use may result in a subsequent inability to use that channel due to a detection of radar signals during a channel availability check. For example, the network device 116 may determine the portion of the channels that satisfy an activity level threshold based on the activity level or score for each channel. For example, the network device 116 may compare the activity level or score for each channel to the activity level threshold. For example, if the activity level threshold is set at greater than zero and the activity level or score for a channel is greater than the threshold level, then the channel satisfies the activity level threshold and the particular channel may continue to be evaluated (rather than be optionally removed from the listing of available channels) in the listing of available channels for the wireless frequency band. For example, the activity level or score for the channel not satisfying the activity level threshold may indicate that the particular channel is being used for radar telemetry in the particular location.

For example, if the activity level threshold is set at zero and satisfying the activity level threshold is considered to be an activity level or score that is equal to or less than zero, (e.g., channels that should no longer be evaluated satisfy the threshold) then, if the activity level or score for the channel is greater than zero, then the channel satisfies the activity level threshold and the particular channel may continue to be evaluated (rather than be optionally removed from the listing of available channels) in the listing of available channels for the wireless frequency band. For example, the activity level or score for the channel satisfying the activity level threshold may indicate that the particular channel is being used for radar telemetry in the particular location.

For example, the network device 116 may determine a portion of the channels that are DFS channels and may compare the activity level or score (e.g., the initial activity level or score or the adjusted activity level or score) of each DFS channel to a activity level threshold to determine if the DFS channel satisfies the activity level threshold. For example, DFS channels with zero or very little activity level or score may be less desirable as a channel option for use by the network device 116 than DFS channels with a moderate activity level or score that satisfy an activity level threshold, because the DFS channel with zero or very little activity level may be an indicator that the particular DFS channel is being used for radar telemetry in the location of the network device 116. For example, if the DFS channel does not satisfy the activity level threshold, the network device 116 or the computing device 104 may remove the DFS channel from the listing of available channels for the wireless frequency band.

In an alternative example, the activity level or score of each DFS channel may be compared to an activity level threshold, and those DFS channels that do not satisfy the activity level threshold (or satisfy a activity level threshold, depending on how the activity level threshold is assigned) may be removed from the listing of available channels for the wireless frequency band. For example, if the activity level threshold is set at greater than zero and the activity level or score for a DFS channel is less than the threshold level, then the DFS channel does not satisfy the activity level threshold and the particular DFS channel may be removed from the listing of available channels for the wireless frequency band. For example, if the activity level threshold is set at zero, satisfying the activity level threshold is considered to be an activity level or score that is equal to or less than zero, and the activity level or score for the DFS channel is zero, then the DFS channel satisfies the activity level threshold and the particular DFS channel may be removed from the listing of available channels for the wireless frequency band.

At 640, the computing device (e.g., the computing device 104) may rank or list the portion of the plurality of wireless channels that remain in the listing of channels (e.g., have not been removed based on the activity level or score for each channel). For example, the computing device 104 may rank or list the portion of the plurality of wireless channels based on the activity level or score for the portion of the plurality of wireless channels satisfying the activity level threshold. For example, the network device may rank or list the channels in order of activity level or score. For example, the computing device 104 may rank or list the channels from lowest activity level or score to highest activity level or score, with the channels having the lowest activity level or score being favored. For example, the channels having the lowest activity level or score are favored if they also satisfy the activity level threshold. For example, the rank or list of the portion of the plurality of wireless channels may include one or more of DFS or non-DFS channels.

At 650, the computing device (e.g., the computing device 104 or the network device 116) may determine a channel of the plurality of wireless channels. For example, the network device 116 may determine a channel of the plurality of wireless channels based on the ranking or listing of the portion of the plurality of wireless channels. For example, a first determined channel may be the highest ranking channel in the ranking of the portion of the plurality of wireless channels. For example, the highest ranking channel may be the channel with the lowest activity level or score and/or the lowest activity level or score that satisfies the activity level threshold. For example, the network device 116 may select the first channel in the ranking. For example, the highest ranking DFS channel may be the DFS channel with the lowest activity level or score that satisfies the activity level threshold (e.g., the activity level or score represents at least a minimal amount of activity on the DFS channel (e.g., a non-zero activity level or score)). For example, the highest ranking non-DFS channel may be the non-DFS channel with the lowest activity level or score, including a zero activity level or score. For example, the highest ranking channel may be a DFS channel or non-DFS channel. For example, in situations where the ranking is inverted (e.g., highest activity level or score to lowest activity level or score), the determination may be as to the lowest ranking channel and the network device 116 may select the last channel in the ranking.

At 660, a computing device (e.g., the computing device 104 or the network device 116) may send an indication of the determined channel to the user device 102. For example, the network device 116 may send data to the user device 102 indicating the determined channel for use based on the ranking. The data may facilitate the display of the selected channel on a display of the user device 102. The data may also include all or a portion of the ranking of the portion of the plurality of wireless channels.

The data may also include the recommended channel width (e.g., 20 MHz, 40 MHz, 80 MHz, or 160 MHz) for the selected channel and/or each ranked channel. The data may include a ranking of only non-DFS channels from lowest activity level or score to highest activity level or score. The data may also include a ranking of only DFS channels from lowest activity level or score to highest activity level or score. For example, channel availability checks may have been completed by the network device 116 for one or more of the ranked DFS channels in the data and a determination made that radar signals were not received for one or more of those DFS channels during the channel availability check.

For example, if the determined channel is a particular type of channel (e.g., a DFS channel), the network device 116 may, prior to sending the indication of the determined channel to the user device 102, conduct a channel availability check for the determined channel. In a channel availability check, a network device 116 may conduct a scan of the determined channel for a preset time period to determine if any radar in proximity (e.g., radar station 202) is using the determined DFS channel. For example, the preset period of time may be any amount of time between 1-10 minutes. For example, the preset period of time may be one minute for a 20 MHz channel, two minutes for a 40 MHz channel, four minutes for an 80 MHz channel, and 8 minutes for a 160 MHz channel. If the network device 116 detects that a radar station 202 is using the determined DFS channel, then the network device 116 may exclude that channel from the list of available channels for an exclusion time period. For example, the exclusion time period may be thirty minutes. After the conclusion of the exclusion time period, the selected channel may be added back into the list of available channels that may be evaluated to determine activity level. For example, if a radar signal is received by the network device 116 while completing the channel availability check, the determined channel may be removed from the ranking or listing of channels or otherwise designated as not available for use, and the network device 116 may determine the next highest channel in the ranking (e.g., the channel with the next lowest activity level or score) for analysis.

Figure 7:
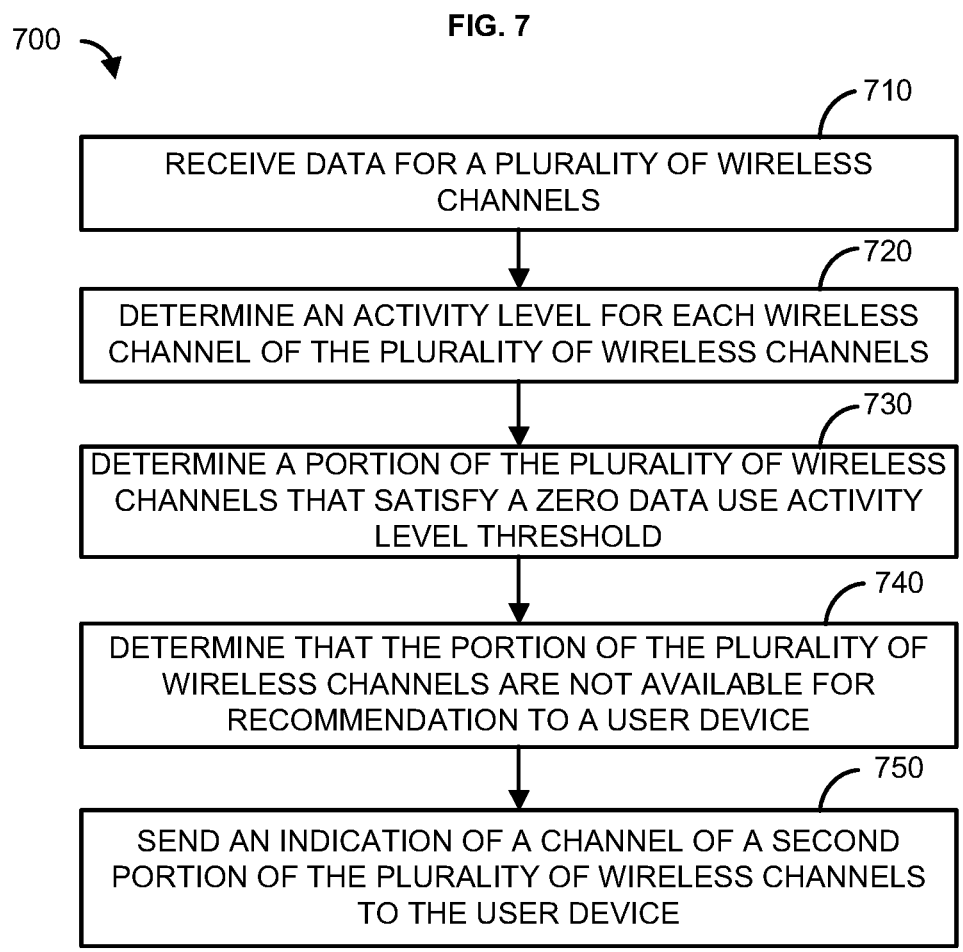
FIG. 7 shows a flowchart of an example method for identifying a network channel for use.

FIG. 7 is a flowchart of an example method 700 for identifying a network channel for use in a wireless network.

For example, the network device 116 may have recently booted up or been rebooted. For example, the user device 102 may alternatively have been communicably connected to the network 105, such as a local area network (LAN), a general wide area network (WAN), and/or the Internet, via the network device 116 using a first wireless channel. The first wireless channel may no longer be operating or operating properly (e.g., latency issues, dropping out). A computing device (e.g., the computing device 104) communicably coupled to the network device 116 (e.g., via the network 105) may evaluate one or more channels in one or more wireless frequency bands (e.g., 5 GHz, 2.4 GHz, etc.). The network device 116 and/or computing device 104 may determine, based on the evaluation, which channel or channels to recommend for use by the network device 116 for network communications with the user device 102.

At 710, a computing device (e.g., the computing device 104 or the network device 116) may receive scan data for each wireless channel of a plurality of wireless channels scanned in the one or more wireless frequency bands. For example, the scan data may be received from a network device (e.g., the network device 116, such as a gateway, router, access point, node, etc.). For example, the network device 116 may passively scan each available channel of the plurality of wireless channels in one or more wireless frequency bands. For example, one of the one or more wireless frequency bands may be a 5 gigahertz (GHz) band, and each available wireless channel may be 20 megahertz, 40 MHz, 80 MHz, or 160 MHz, within the 5 GHz band. For example, one of the one or more wireless frequency bands may be a 2.4 GHz band, a 3.6 GHz band, a 4.9 GHz band, a 5.9 GHz band, or another frequency band now known or hereinafter developed). For example, the computing device 104 may receive local Wi-Fi airtime utilization data for each channel of the plurality of wireless channels scanned in the one or more wireless frequency bands by the network device 116. For example, the local Wi-Fi airtime utilization data for each channel scanned may include a number of overlapping basic service sets (OBSS) heard, a channel utilization per OBSS, a channel utilization per channel, a presence of P20, S20, S40low, and/or S40high. The received scan data may be transmitted or sent to a recommendation engine (e.g., the recommendation engine 120) or another processing software for analysis. In certain examples, the transmission is an internal transmission within the computing device 104. In other examples, the received scan data may be transmitted or sent from the computing device 104 to another computing device for analysis.

At 720, the computing device (e.g., the recommendation engine 120 of the computing device 104 or the network device 116) may determine an activity level or score for each wireless channel of the plurality of wireless channels. For example, the activity level may be a score or numerical indicator of the activity level and/or busyness of the particular channel. For example, the activity level or score may be determined based on at least a portion of the received scan data for each of the channels of the plurality of wireless channels in the one or more wireless frequency bands. For example, the activity level may be determine based on one or more of number of OBSS heard by the channel, the channel utilization for the channel, the number of beacons heard on the channel, the RSSI, the RCPI, the number of frames heard that are outside the BSS. For example, other scan data for the channel may be used in addition to or in the alternative for any of the other scan data listed. For example, if only non-DFS channels are scanned by the network device 116, then the recommendation engine 120 may only determine an activity level for each of the non-DFS channels in the one or more wireless frequency bands. In this example, the recommendation engine 120 may, for each of the DFS channels in the wireless frequency band, which have not been scanned or for which scan data has not been received, determine that each DFS channel has a lower activity level/score than the non-DFS channel with the lowest activity level/score.

At 730, the computing device (e.g., computing device 104 or the network device 116) may determine a portion of the plurality of wireless channels that satisfies a zero data use activity level threshold. For example, the computing device 104 may determine the portion of the plurality of wireless channels that satisfies the zero data use activity level threshold based on the activity level or score for each wireless channel of the plurality of wireless channels. For example, the computing device 104 may compare the activity level or score for each wireless channel (or a portion thereof (e.g., DFS channels)) of the plurality of wireless channels to the zero data use activity level threshold to determine if the particular wireless channel satisfies the zero data use activity level threshold. For example, a zero data activity level threshold may be zero or a very low number (e.g., less than 1) that represents zero activity or a very small amount of activity on a particular wireless channel. For example, a wireless channel may satisfy the zero data use activity level threshold if the activity level or score for the particular channel is less than or less than or equal to the zero data activity level threshold. For example, a wireless channel may not satisfy the zero data use activity level threshold if the activity level or score for the particular channel is greater than the zero data use activity level threshold. For example, the plurality of wireless channels may be one or more of DFS channels or non-DFS channels.

For example, if the channel has no activity level or a very small activity level (or a zero or very low (e.g., less than 1) activity score), that may be representative of no activity being identified during the scan of that channel. A lack of activity on a channel may represent an increased likelihood that the particular channel is being used for another purpose, such as a non-network purpose (e.g., by an active radar system, which would prohibit network devices from using the particular channel). Accordingly, selecting a channel that satisfies the zero data use activity level threshold (e.g., a channel that has a zero activity level (or score) or very low activity level (or score)) for presentation to a user for use may result in a subsequent inability to use that channel due to a detection of radar signals during a channel availability check of that particular channel.

For example, the computing device 104 or the network device 116 may determine the portion of the channels that satisfies a zero data use activity level threshold based on the activity level or score for each channel of the plurality of wireless channels. For example, the computing device 104 may compare the activity level or score for each channel to the zero data use activity level threshold. For example, if the zero data use activity level threshold is set at zero or greater than zero and the activity level or score for a channel is less than, or less than or equal to the zero data use activity level threshold, then the channel satisfies the zero data use activity level threshold. For example, the computing device 104 or network device 116 may determine a second portion of the plurality of wireless channels that does not satisfy the zero data use activity level threshold based on the activity level or score for each of the second portion of the plurality of wireless channels. For example, the computing device 104 may compare the activity level or score for each channel to the zero data use activity level threshold. For example, if the zero data use activity level threshold is set at zero or greater than zero and the activity level or score for a channel is greater than the zero data use activity level threshold, then the channel (e.g., the second portion of the plurality of wireless channels) does not satisfy the zero data use activity level threshold.

For example, the network device 116 may determine a portion of the plurality of wireless channels that are DFS channels and may compare the activity level or score of each DFS channel to the zero data use activity level threshold to determine if the DFS channel satisfies the zero data use activity level threshold. For example, DFS channels with zero or very little activity level or score and that satisfy the zero data use activity level threshold may be less desirable as a channel option for use by the network device 116 than DFS channels with a moderate activity level or score that does not satisfy the zero data use activity level threshold, because the DFS channel with zero or very little activity level may be an indicator that the particular DFS channel is being used for radar telemetry in the location of the network device 116. For example, one or more DFS channels (e.g., a portion of the DFS channels) may satisfy the zero data use activity level threshold and one or more other DFS channels (e.g., a second portion of the DFS channels) may not satisfy the zero data use activity level threshold.

At 740, the computing device (e.g., computing device 104 or the network device 116) may determine that the portion of the plurality of wireless channels are not available for recommendation to a user device (e.g., the user device 102). For example, the determination may be based on the portion of the plurality of wireless channels satisfying the zero data use activity level threshold. For example, the computing device 104 may also determine that a second portion of the plurality of wireless channels are available for recommendation to the user device 102. For example, the determination that the second portion of the plurality of wireless channels are available for recommendation may be based on the second portion of the plurality of wireless channels not satisfying the zero data use activity level threshold and/or being non-DFS channels.

For example, the portion of the plurality of wireless channels not available for recommendation may be removed from a listing of available channels for the one or more wireless frequency bands to be selected for presentation to a user device 102. For example, a portion of the plurality of wireless channels may be removed from the listing of available channels based on satisfying the zero data use activity level threshold. For example, the second portion of the plurality of wireless channels that are available for recommendation may remain or may be added to the listing of available channels for the one or more wireless frequency bands to be selected for presentation to the user device 102. For example, the second portion of the plurality of wireless channels that may remain or be added to the listing of available channels for recommendation to the user device 102 based on the second portion of the plurality of wireless channels not satisfying the zero data use activity level threshold and/or being a non-DFS channel.

For example, the comparison to the zero data use activity level threshold may be completed for DFS channels and not for non-DFS channels. For example, the network device 116 or the computing device 104 may remove the portion of the DFS channels that satisfy the zero data use activity level threshold from the listing of available channels for the one or more wireless frequency bands. For example, if one or more DFS channels (e.g., a second portion of the DFS channels) does not satisfy the zero data use activity level threshold, the network device 116 or the computing device 104 may continue evaluating the second portion of the DFS channels for potential selection and presentation as a network channel to the user device 102. For example, the network device 116 or the computing device 104 may rank or organize the second portion of the plurality of channels based on each channels activity level or score. For example, the ranking of the channels (e.g., in the second portion of the plurality of channels) may be from lowest activity level or score to highest activity level or score. For example, the ranking of channels may include one or more of DFS channels or non-DFS channels.

At 750, a computing device (e.g., the computing device 104 or the network device 116) may send an indication of a channel of the second portion of the plurality of wireless channels to the user device 102. For example, the network device 116 may send data to the user device 102 indicating the channel of the second portion of the plurality of channels for use based on the ranking of channels. The data may facilitate the display of the channel on a display of the user device 102. The data may also include all or a portion of the ranking of the second portion of the plurality of wireless channels.

For example, prior to sending the indication of the channel, the computing device (e.g., the computing device 104 or the network device 116) may determine the channel of the second portion of the plurality of wireless channels to send to the user device 102. For example, the network device 116 may determine a channel of the second portion of the plurality of wireless channels based on the ranking or listing of the second portion of the plurality of wireless channels. For example, the channel may be the highest ranking channel in the ranking of the second portion of the plurality of wireless channels. For example, the highest ranking channel may be the channel with the lowest activity level or score and/or the lowest activity level or score that does not satisfy the zero data use activity level threshold. For example, the network device 116 may select the first channel in the ranking. For example, the highest ranking DFS channel may be the DFS channel with the lowest activity level or score that does not satisfy the zero data use activity level threshold. For example, the highest ranking non-DFS channel may be the non-DFS channel with the lowest activity level or score, including a zero activity level or score. For example, the highest ranking channel may be a DFS channel or a non-DFS channel. For example, in situations where the ranking is inverted (e.g., highest activity level or score to lowest activity level or score), the determination may be as to the lowest ranking channel and the network device 116 may select the last channel in the ranking.

The indication sent to the user device 102 may also include the recommended channel width (e.g., 20 MHz, 40 MHz, 80 MHz, or 160 MHz) for the selected channel and/or each ranked channel. The indication may include a ranking of only non-DFS channels from lowest activity level or score to highest activity level or score. The data may include a ranking of only DFS channels from lowest activity level or score to highest activity level or score. For example, channel availability checks may have been completed by the network device 116 for one or more of the ranked DFS channels in the data and a determination made that radar signals were not received for one or more of those DFS channels during the channel availability check.

For example, if the determined channel is a particular type of channel (e.g., a DFS channel), the network device 116 may, prior to sending the indication of the channel to the user device 102, conduct a channel availability check for the channel. In a channel availability check, a network device 116 may conduct a scan of the channel for a preset time period to determine if any radar in proximity (e.g., radar station 202) is using the channel. For example, the preset period of time may be any amount of time between 1-10 minutes. For example, the preset period of time may be one minute for a 20 MHz channel, two minutes for a 40 MHz channel, four minutes for an 80 MHz channel, and 8 minutes for a 160 MHz channel. If the network device 116 detects that a radar station 202 is using the channel, then the network device 116 may exclude that channel from the list of available channels for an exclusion time period. For example, the exclusion time period may be thirty minutes. After the conclusion of the exclusion time period, the selected channel may be added back into the list of available channels that may be evaluated to determine activity level. For example, if a radar signal is received by the network device 116 while completing the channel availability check, the channel may be removed from the ranking or listing of channels of the second portion of the plurality of wireless channels or otherwise designated as not available for use, and the network device 116 may determine the next highest channel in the ranking (e.g., the channel with the next lowest activity level or score) for analysis.

Figure 8:
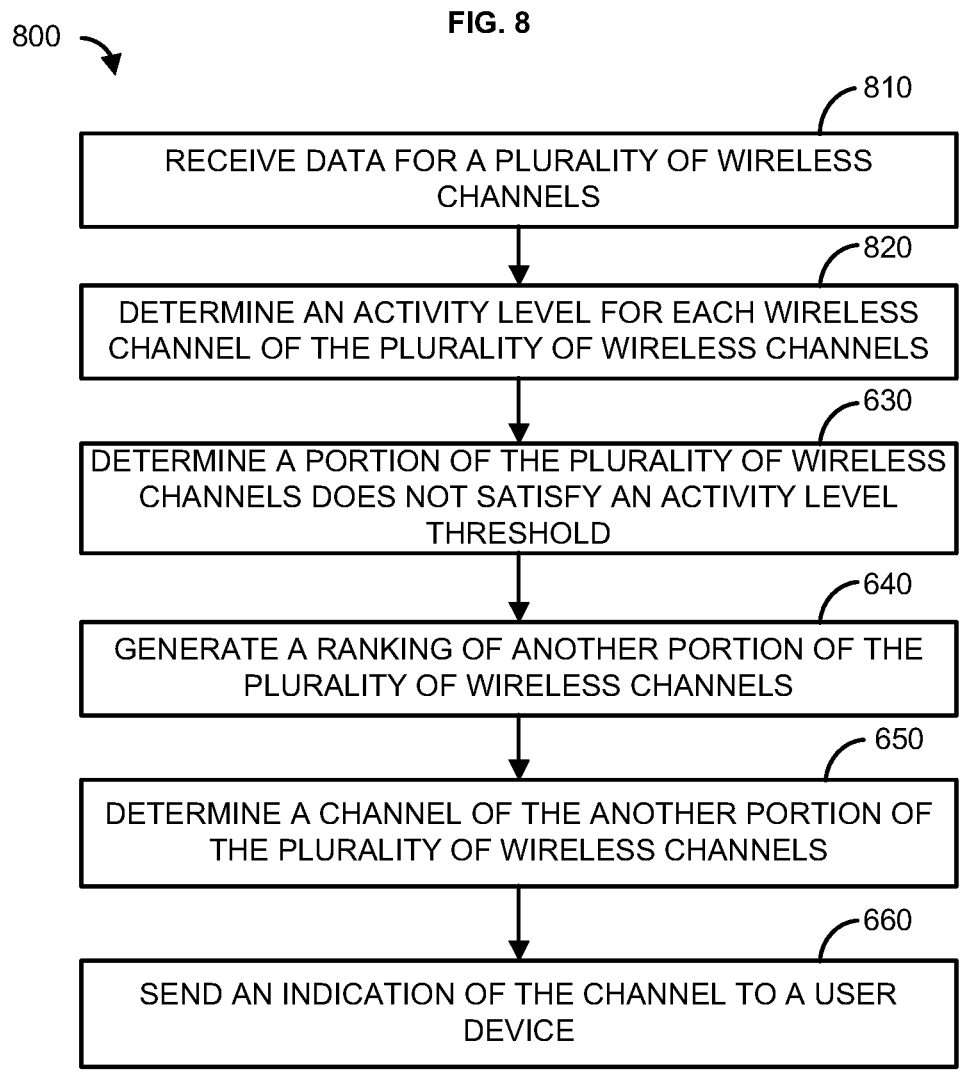
FIG. 8 shows a flowchart of an example method for identifying a network channel for use.

FIG. 8 is a flowchart of an example method 800 for identifying a network channel for use in a wireless network. For example, the network device 116 may have recently booted up or been rebooted. For example, the user device 102 may alternatively have been communicably connected to the network 105, such as a local area network (LAN), a general wide area network (WAN), and/or the Internet, via the network device 116 using a first wireless channel. The first wireless channel may no longer be operating or operating properly (e.g., latency issues, dropping out). A computing device (e.g., the computing device 104) communicably coupled to the network device 116 (e.g., via the network 105) may evaluate one or more channels in one or more wireless frequency bands (e.g., 5 GHz, 2.4 GHz, etc.). The network device 116 and/or computing device 104 may determine, based on the evaluation, which channel or channels to recommend for use by the network device 116 for network communications with the user device 102.

At 810, a computing device (e.g., the computing device 104 or the network device 116) may receive scan data for each wireless channel scanned in the one or more wireless frequency bands. For example, the scan data may be received from a network device (e.g., the network device 116, such as a gateway, router, access point, node, etc.). For example, the network device 116 may passively scan each available channel in one or more wireless frequency bands. For example, one of the one or more wireless frequency bands may be a 5 gigahertz (GHz) band, and each available wireless channel may be 20 megahertz, 40 MHz, 80 MHz, or 160 MHz, within the 5 GHz band. For example, one of the one or more wireless frequency bands may be a 2.4 GHz band, a 3.6 GHz band, a 4.9 GHz band, a 5.9 GHz band, or another frequency band now known or hereinafter developed). For example, the computing device 104 may receive local Wi-Fi airtime utilization data for each channel scanned in the wireless frequency band by the network device 116. For example, the local Wi-Fi airtime utilization data for each channel scanned may include a number of overlapping basic service sets (OBSS) heard, a channel utilization per OBSS, a channel utilization per channel, a presence of P20, S20, S40low, and/or S40high. The received scan data may be transmitted or sent to a recommendation engine (e.g., the recommendation engine 120) or another processing software for analysis. In certain examples, the transmission is an internal transmission within the computing device 104. In other examples, the received scan data may be transmitted or sent from the computing device 104 to another computing device for analysis.

At 820, the computing device (e.g., the recommendation engine 120 of the computing device 104 or the network device 116) may determine an activity level or score for each wireless channel of the plurality of wireless channels. For example, the activity level may be a score or numerical indicator of the activity level and/or busyness of the particular channel. For example, the activity level or score may be determined based on at least a portion of the received scan data for each of the channels in the wireless frequency band. For example, the activity level may be determine based on one or more of number of OBSS heard by the channel, the channel utilization for the channel, the number of beacons heard on the channel, the RSSI, the RCPI, the number of frames heard that are outside the BSS. For example, other scan data for the channel may be used in addition to or in the alternative for any of the other scan data listed. For example, if only non-DFS channels are scanned by the network device 116, then the recommendation engine 120 may only determine an activity level for each of the non-DFS channels in the one or more wireless frequency bands. In this example, the recommendation engine 120 may, for each of the DFS channels in the wireless frequency band, which have not been scanned or for which scan data has not been received, determine that each DFS channel has a lower activity level/score than the non-DFS channel with the lowest activity level/score.

At 830, the computing device (e.g., computing device 104 or the network device 116) may determine a portion of the plurality of wireless channels that does not satisfy an activity level threshold. For example, the computing device 104 may determine the portion of the plurality of wireless channels that does not satisfy the activity level threshold based on the activity level or score for each wireless channel of the plurality of wireless channels. For example, the computing device 104 may compare the activity level or score for each wireless channel (or a portion thereof (e.g., DFS channels)) of the plurality of wireless channels to the activity level threshold to determine if the particular wireless channel does not satisfy the activity level threshold. For example, the plurality of wireless channels may be one or more of DFS channels or non-DFS channels.

For example, if the channel has no activity level or a very small activity level (or a zero or very low (e.g., less than 1) activity score), that may be representative of no activity being identified during the scan of that channel. A lack of activity on a channel may represent an increased likelihood that the particular channel is being used for another purpose, such as a non-network purpose (e.g., by an active radar system, which would prohibit network devices from using the particular channel). Accordingly, selecting a channel that has a zero or very low activity level (or score) for presentation to a user for use may result in a subsequent inability to use that channel due to a detection of radar signals during a channel availability check of that particular channel.

For example, the computing device 104 or the network device 116 may determine the portion of the channels that do not satisfy an activity level threshold based on the activity level or score for each channel. For example, the computing device 104 may compare the activity level or score for each channel to the activity level threshold. For example, if the activity level threshold is set at greater than zero and the activity level or score for a channel is less than the threshold level, then the channel does not satisfy the activity level threshold and the particular channel may be removed from a listing of available channels for the one or more wireless frequency bands to be selected for presentation to a user device 102. For example, a portion of the plurality of wireless channels may not satisfy the activity level threshold and may need to be removed from the listing of available channels to be selected for presentation to the user device. For example, the activity level or score for the channel not satisfying the activity level threshold may indicate that the particular channel is being used for radar telemetry in the particular location. For example, one or more of another portion of the plurality of wireless channels may each have an activity level or score that satisfies the activity level threshold, and the one or more of the another portion of the plurality of wireless channels may be available for selection and presentation to the user device 102.

In another example, if the activity level threshold is set at zero or substantially zero and satisfying the activity level threshold is considered to be an activity level or score that is equal to or less than the activity level threshold, then the computing device 104 or the network device 116 may determine that a portion of the channels satisfy an activity level threshold based on the activity level or score for each channel and may need to be removed from the listing of available channels to be selected for presentation to the user device. For example, the activity level or score for the channel satisfying the activity level threshold may indicate that the particular channel is being used for radar telemetry in the particular location. For example, one or more of another portion of the plurality of wireless channels may each have an activity level or score that does not satisfy the activity level threshold (e.g., has an activity level or score greater than the activity level threshold), and the one or more of the another portion of the plurality of wireless channels may be available for selection and presentation to the user device 102.

For example, the network device 116 may determine a portion of the channels that are DFS channels and may compare the activity level or score of each DFS channel to an activity level threshold to determine if the DFS channel satisfies the activity level threshold. For example, DFS channels with zero or very little activity level or score may be less desirable as a channel option for use by the network device 116 than DFS channels with a moderate activity level or score that satisfy an activity level threshold (or do not satisfy the activity level threshold depending on how the threshold is set up), because the DFS channel with zero or very little activity level may be an indicator that the particular DFS channel is being used for radar telemetry in the location of the network device 116. For example, if one or more DFS channels (e.g., a portion of the DFS channels) does not satisfy the activity level threshold, the network device 116 or the computing device 104 may remove the portion of the DFS channels from the listing of available channels for the wireless frequency band. For example, if one or more DFS channels (e.g., another portion of the DFS channels) does satisfy the activity level threshold, the network device 116 or the computing device 104 may continue evaluating the another portion of the DFS channels for potential selection and presentation as a network channel to the user device 102.

At 840, the computing device (e.g., the computing device 104 or network device 116)) may rank or list the another portion of the plurality of wireless channels that remain in the listing of channels (e.g., have not been removed based on the activity level or score for each channel as compared to an activity level threshold). For example, the computing device 104 may rank or list the another portion of the plurality of wireless channels based on the activity level or score for the another portion of the plurality of wireless channels satisfying the activity level threshold. For example, the network device may rank or list the another portion of the plurality of channels in order of activity level or score. For example, the computing device 104 may rank or list the another portion of the plurality of channels from lowest activity level or score to highest activity level or score, with the channels having the lowest activity level or score being favored. For example, the another portion of the plurality of wireless channels having the lowest activity level or score are favored if they also satisfy the activity level threshold. For example, the ranking or list of the another portion of the plurality of wireless channels may include one or more of DFS or non-DFS channels.

At 850, the computing device (e.g., the computing device 104 or the network device 116) may determine a channel of the another portion of the plurality of wireless channels. For example, the network device 116 may determine a channel of the another portion of the plurality of wireless channels based on the ranking or listing of the another portion of the plurality of wireless channels. For example, a first determined channel may be the highest ranking channel in the ranking of the another portion of the plurality of wireless channels. For example, the highest ranking channel may be the channel with the lowest activity level or score and/or the lowest activity level or score that satisfies the activity level threshold. For example, the network device 116 may select the first channel in the ranking. For example, the highest ranking DFS channel may be the DFS channel with the lowest activity level or score that satisfies the activity level threshold (e.g., the activity level or score represents at least a minimal amount of activity on the DFS channel (e.g., a non-zero activity level or score)). For example, the highest ranking non-DFS channel may be the non-DFS channel with the lowest activity level or score, including a zero activity level or score. For example, the highest ranking channel may be a DFS channel or a non-DFS channel. For example, in situations where the ranking is inverted (e.g., highest activity level or score to lowest activity level or score), the determination may be as to the lowest ranking channel and the network device 116 may select the last channel in the ranking.

At 860, a computing device (e.g., the computing device 104 or the network device 116) may send an indication of the determined channel to the user device 102. For example, the network device 116 may send data to the user device 102 indicating the determined channel for use based on the ranking. The data may facilitate the display of the selected channel on a display of the user device 102. The data may also include all or a portion of the ranking of the another portion of the plurality of wireless channels.

The data may also include the recommended channel width (e.g., 20 MHz, 40 MHz, 80 MHz, or 160 MHz) for the selected channel and/or each ranked channel. The data may include a ranking of only non-DFS channels from lowest activity level or score to highest activity level or score. The data may include a ranking of only DFS channels from lowest activity level or score to highest activity level or score in the another portion of the plurality of wireless channels. For example, channel availability checks may have been completed by the network device 116 for one or more of the ranked DFS channels in the data and a determination made that radar signals were not received for one or more of those DFS channels during the channel availability check.

For example, if the determined channel is a particular type of channel (e.g., a DFS channel), the network device 116 may, prior to sending the indication of the determined channel to the user device 102, conduct a channel availability check for the determined channel. In a channel availability check, a network device 116 may conduct a scan of the determined channel for a preset time period to determine if any radar in proximity (e.g., radar station 202) is using the determined DFS channel. For example, the preset period of time may be any amount of time between 1-10 minutes. For example, the preset period of time may be one minute for a 20 MHz channel, two minutes for a 40 MHz channel, four minutes for an 80 MHz channel, and 8 minutes for a 160 MHz channel. If the network device 116 detects that a radar station 202 is using the determined DFS channel, then the network device 116 may exclude that channel from the list of available channels for an exclusion time period. For example, the exclusion time period may be thirty minutes. After the conclusion of the exclusion time period, the selected channel may be added back into the list of available channels in the another portion of the plurality of wireless channels that may be evaluated to determine activity level. For example, if a radar signal is received by the network device 116 while completing the channel availability check, the determined channel may be removed from the ranking or listing of channels or otherwise designated as not available for use, and the network device 116 may determine the next highest channel in the ranking (e.g., the channel with the next lowest activity level or score) for analysis.

Figure 9:
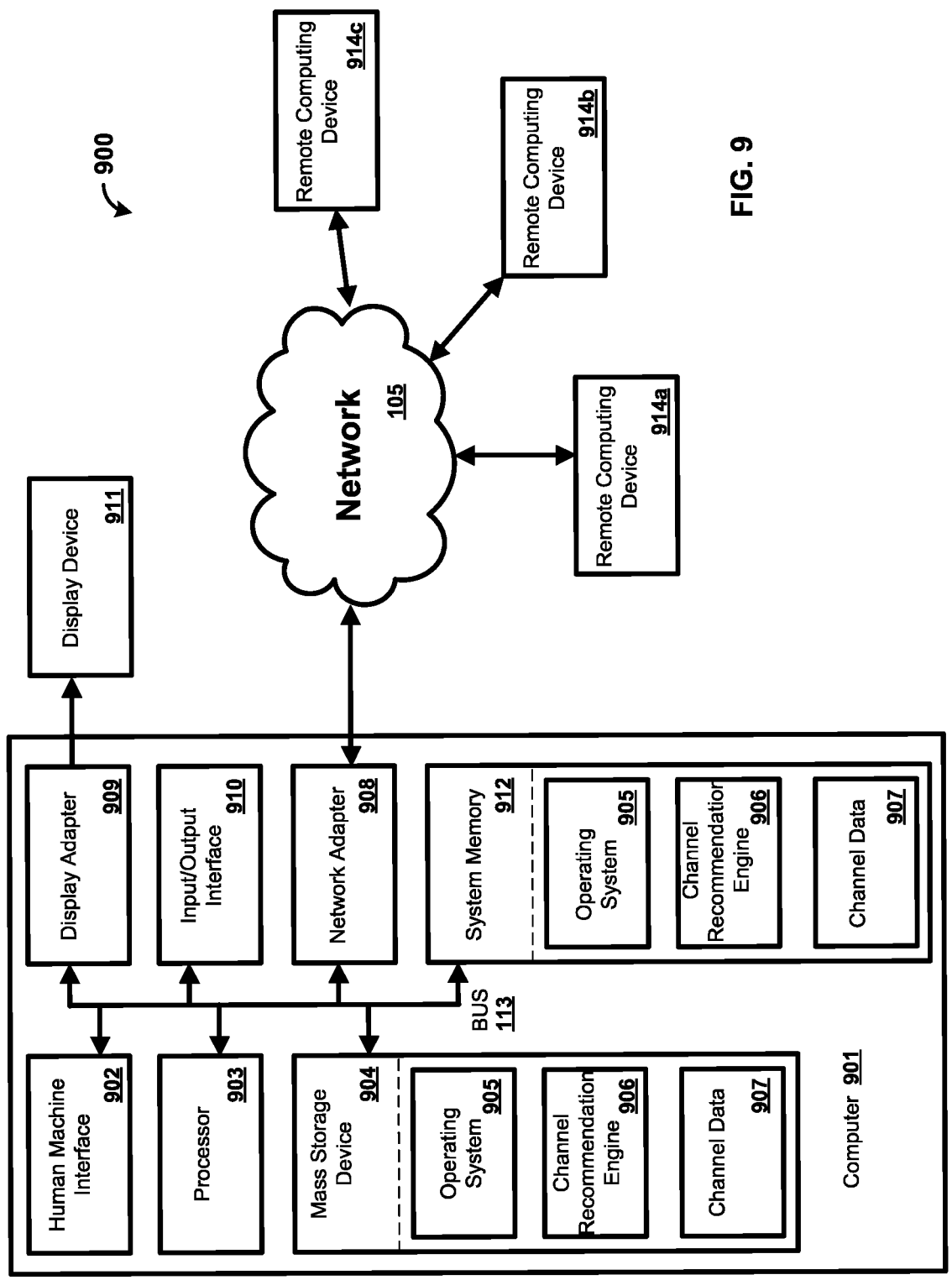
FIG. 9 shows a block diagram of an example computing device for implementing an identification of a network channel for use.

FIG. 9 shows a system 900 that shows a computing device for implementing an identification of a network channel for use. Any device/component described herein may be a computer 901 as shown in FIG. 9.

The computer 901 may include one or more processors 903, a system memory 912, and a bus 913 that couples various components of the computer 901 including the one or more processors 903 to the system memory 912. In the case of multiple processors 903, the computer 901 may utilize parallel computing.

The bus 913 may include one or more of several possible types of bus structures, such as a memory bus, memory controller, a peripheral bus, an accelerated graphics port, and a processor or local bus using any of a variety of bus architectures.

The computer 901 may operate on and/or include a variety of computer-readable media (e.g., non-transitory). Computer-readable media may be any available media that is accessible by the computer 901 and includes, non-transitory, volatile and/or non-volatile media, removable and non-removable media. The system memory 912 has computer readable media in the form of volatile memory, such as random access memory (RAM), and/or non-volatile memory, such as read-only memory (ROM). The system memory 912 may store data such as wireless channel data 907 and/or program modules such as an operating system 905 and a channel recommendation engine 906 that are accessible to and/or are operated on by the one or more processors 903.

The computer 901 may also include other removable/non-removable, volatile/non-volatile computer storage media. The mass storage device 904 may provide non-volatile storage of computer code, computer readable instructions, data structures, program modules, and other data for the computer 901. The mass storage device 904 may be a hard disk, a removable magnetic disk, a removable optical disk, magnetic cassettes or other magnetic storage devices, flash memory cards, CD-ROM, digital versatile disks (DVD) or other optical storage, random access memories (RAM), read-only memories (ROM), electrically erasable programmable read-only memory (EEPROM), and the like.

Any number of program modules may be stored on the mass storage device 904. An operating system 905 and channel recommendation engine software 906 may be stored on the mass storage device 904. One or more of the operating system 905 and channel recommendation engine software 906 (or some combination thereof) may include program modules and the channel recommendation engine 906. Wireless channel data 907 may also be stored on the mass storage device 904. The channel data 907 may be stored in any of one or more databases known in the art. The databases may be centralized or distributed across multiple locations within the network 105.

A user may enter commands and information into the computer 901 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 903 via a human machine interface 902 that is coupled to the bus 913, but may be connected by other interface and bus structures, such as a parallel port, game port, an IEEE 1394 Port (also known as a Firewire port), a serial port, network adapter 908, and/or a universal serial bus (USB).

A display device 911 may also be connected to the bus 913 via an interface, such as a display adapter 909. It is contemplated that the computer 901 may have more than one display adapter 909 and the computer 901 may have more than one display device 911. A display device 911 may be a monitor, an LCD (Liquid Crystal Display), light-emitting diode (LED) display, television, smart lens, smart glass, and/or a projector. In addition to the display device 911, other output peripheral devices may comprise components such as speakers (not shown) and a printer (not shown) which may be connected to the computer 901 via Input/Output Interface 910. Any step and/or result of the methods may be output (or caused to be output) in any form to an output device. Such output may be any form of visual representation, including, but not limited to, textual, graphical, animation, audio, tactile, and the like. The display 911 and computer 901 may be part of one device, or separate devices.

The computer 901 may operate in a networked environment using logical connections to one or more remote computing devices 914*a*, 914*b*, 914*c*. A remote computing device 914*a*, 914*b*, 914*c* may be a personal computer, computing station (e.g., workstation), portable computer (e.g., laptop, mobile phone, tablet device), smart device (e.g., smartphone, smartwatch, activity tracker, smart apparel, smart accessory), security and/or monitoring device, a server, a router, a network computer, a peer device, edge device or other common network nodes, and so on. Logical connections between the computer 901 and a remote computing device 914*a*, 914*b*, 914*c* may be made via a network 105, such as a local area network (LAN) and/or a general wide area network (WAN). Such network connections may be through a network adapter 908. A network adapter 908 may be implemented in both wired and wireless environments. Such networking environments are conventional and commonplace in dwellings, offices, enterprise-wide computer networks, intranets, and the Internet.

Application programs and other executable program components such as the operating system 905 are shown herein as discrete blocks, although it is recognized that such programs and components may reside at various times in different storage components of the computing device 901, and are executed by the one or more processors 903 of the computer 901. An implementation of key synchronization software 906 may be stored on or sent across some form of computer readable media. Any of the disclosed methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
   receiving, by a network device, data for a plurality of wireless channels;
   determining, based on at least a portion of the data, an activity level for each wireless channel of the plurality of wireless channels;
   determining, based on the activity level for each wireless channel of the plurality of wireless channels, a portion of the plurality of wireless channels that satisfy a zero data use activity level threshold;
   determining, based on the portion of the plurality of wireless channels satisfying the zero data use activity level threshold, that the portion of the plurality of wireless channels are not available for recommendation to a user device; and
   sending, to the user device, an indication of a channel of a second portion of the plurality of wireless channels.

2. The method of claim 1, further comprising generating, based on the activity level for each wireless channel of the second portion of the plurality of wireless channels, a ranking of the second portion of the plurality of wireless channels.

3. The method of claim 1, wherein the zero data use activity level threshold captures one or more of the plurality of wireless channels with an activity level indicating one or more of zero activity or a small amount of activity on a respective wireless channel of the plurality of wireless channels.

4. The method of claim 1, further comprising:
   determining the channel of the second portion of the plurality of wireless channels comprises a radar signal; and
   determining, based on the activity level, a second channel of the second portion of the plurality of wireless channels.

5. The method of claim 1, wherein each wireless channel of the second portion of the plurality of wireless channels does not satisfy the zero data use activity level threshold.

6. The method of claim 1, wherein the activity level for each respective wireless channel of the plurality of wireless channels is determined based on one or more of a channel utilization for the respective wireless channel or a number of overlapping basic service sets (OBSS) for the respective wireless channel.

7. The method of claim 1, wherein the plurality of wireless channels comprise one or more of dynamic frequency selection (DFS) wireless channels or non-DFS wireless channels.

8. The method of claim 1, further comprising adjusting, based on the data, the activity level for one or more of the plurality of wireless channels.

9. The method of claim 1, further comprising:
   scanning the channel of the second portion of the plurality of wireless channels for a radar signal; and
   determining, based on the scan of the channel of the second portion of the plurality of wireless channels, the channel, of the second portion of the plurality of wireless channels, does not include the radar signal,
   wherein the indication of the channel, of the second portion of the plurality of wireless channels, is sent to the user device based on the determination that the channel, of the second portion of the plurality of wireless channels, does not include the radar signal.

10. The method of claim 1, wherein an activity level for each wireless channel of the second portion of the plurality of wireless channels indicates at least some activity on each respective wireless channel of the second portion of the plurality of wireless channels.

11. An apparatus comprising:
    one or more processors; and
    memory storing processor-executable instructions that, when executed by the one or more processors, cause the apparatus to:
    receive data for a plurality of wireless channels;
    determine, based on at least a portion of the data, an activity level for each wireless channel of the plurality of wireless channels;
    determine, based on the activity level for each wireless channel of the plurality of wireless channels, a portion of the plurality of wireless channels that satisfy a zero data use activity level threshold;
    determine, based on the portion of the plurality of wireless channels satisfying the zero data use activity level threshold, that the portion of the plurality of wireless channels are not available for recommendation to a user device; and
    send, to the user device, an indication of a channel of a second portion of the plurality of wireless channels.

12. The apparatus of claim 11, wherein the processor-executable instructions, when executed by the one or more processors, further cause the apparatus to generate, based on the activity level for each wireless channel of the second portion of the plurality of wireless channels, a ranking of the second portion of the plurality of wireless channels.

13. The apparatus of claim 11, wherein the zero data use activity level threshold captures one or more of the plurality of wireless channels with an activity level indicating one or more of zero activity or a small amount of activity on a respective wireless channel of the plurality of wireless channels.

14. The apparatus of claim 11, wherein the processor-executable instructions, when executed by the one or more processors, further cause the apparatus to:
determine the channel of the second portion of the plurality of wireless channels comprises a radar signal; and
determine, based on the activity level, a second channel of the second portion of the plurality of wireless channels.

15. The apparatus of claim 11, wherein each wireless channel of the second portion of the plurality of wireless channels does not satisfy the zero data use activity level threshold.

16. The apparatus of claim 11, wherein the activity level for each respective wireless channel of the plurality of wireless channels is determined based on one or more of a channel utilization for the respective wireless channel or a number of overlapping basic service sets (OBSS) for the respective wireless channel.

17. The apparatus of claim 11, wherein the plurality of wireless channels comprise one or more of dynamic frequency selection (DFS) wireless channels or non-DFS wireless channels.

18. The apparatus of claim 11, wherein the processor-executable instructions, when executed by the one or more processors, further cause the apparatus to adjust, based on the data, the activity level for one or more of the plurality of wireless channels.

19. The apparatus of claim 11, wherein the processor-executable instructions, when executed by the one or more processors, further cause the apparatus to:
scan the channel of the second portion of the plurality of wireless channels for a radar signal; and
determine, based on the scan of the channel of the second portion of the plurality of wireless channels, the channel, of the second portion of the plurality of wireless channels, does not include the radar signal,
wherein the processor-executable instructions that, when executed by the one or more processors, cause the apparatus to send the indication of the channel, of the second portion of the plurality of wireless channels, to the user device, cause the apparatus to send the indication of the channel, of the second portion of the plurality of wireless channels, to the user device based on the determination that the channel, of the second portion of the plurality of wireless channels does not include the radar signal.

20. The apparatus of claim 11, wherein an activity level for each wireless channel of the second portion of the plurality of wireless channels indicates at least some activity on each respective wireless channel of the second portion of the plurality of wireless channels.

21. One or more non-transitory computer-readable media storing processor-executable instructions that, when executed by at least one processor, cause the at least one processor to:
receive data for a plurality of wireless channels;
determine, based on at least a portion of the data, an activity level for each wireless channel of the plurality of wireless channels;
determine, based on the activity level for each wireless channel of the plurality of wireless channels, a portion of the plurality of wireless channels that satisfy a zero data use activity level threshold;
determine, based on the portion of the plurality of wireless channels satisfying the zero data use activity level threshold, that the portion of the plurality of wireless channels are not available for recommendation to a user device; and
send, to the user device, an indication of a channel of a second portion of the plurality of wireless channels.

22. The one or more non-transitory computer-readable media of claim 21, wherein the processor-executable instructions, when executed by the at least one processor, further cause the at least one processor to generate, based on the activity level for each wireless channel of the second portion of the plurality of wireless channels, a ranking of the second portion of the plurality of wireless channels.

23. The one or more non-transitory computer-readable media of claim 21, wherein the zero data use activity level threshold captures one or more of the plurality of wireless channels with an activity level indicating one or more of zero activity or a small amount of activity on a respective wireless channel of the plurality of wireless channels.

24. The one or more non-transitory computer-readable media of claim 21, wherein the processor-executable instructions, when executed by the at least one processor, further cause the at least one processor to:
determine the channel of the second portion of the plurality of wireless channels comprises a radar signal; and
determine, based on the activity level, a second channel of the second portion of the plurality of wireless channels.

25. The one or more non-transitory computer-readable media of claim 21, wherein each wireless channel of the second portion of the plurality of wireless channels does not satisfy the zero data use activity level threshold.

26. The one or more non-transitory computer-readable media of claim 21, wherein the activity level for each respective wireless channel of the plurality of wireless channels is determined based on one or more of a channel utilization for the respective wireless channel or a number of overlapping basic service sets (OBSS) for the respective wireless channel.

27. The one or more non-transitory computer-readable media of claim 21, wherein the plurality of wireless channels comprise one or more of dynamic frequency selection (DFS) wireless channels or non-DFS wireless channels.

28. The one or more non-transitory computer-readable media of claim 21, wherein the processor-executable instructions, when executed by the at least one processor, further cause the at least one processor to adjust, based on the data, the activity level for one or more of the plurality of wireless channels.

29. The one or more non-transitory computer-readable media of claim 21, wherein the processor-executable instructions, when executed by the at least one processor, further cause the at least one processor to:
scan the channel of the second portion of the plurality of wireless channels for a radar signal; and
determine, based on the scan of the channel of the second portion of the plurality of wireless channels, the channel, of the second portion of the plurality of wireless channels, does not include the radar signal,
wherein the processor-executable instructions that, when executed by the at least one processor, cause the at least one processor to send the indication of the channel, of the second portion of the plurality of wireless channels, to the user device, cause the at least one processor to send the indication of the channel, of the second portion of the plurality of wireless channels, to the user device based on the determination that the channel, of the second portion of the plurality of wireless channels, does not include the radar signal.

30. The one or more non-transitory computer-readable media of claim 21, wherein an activity level for each wireless channel of the second portion of the plurality of wireless channels indicates at least some activity on each respective wireless channel of the second portion of the plurality of wireless channels.

31. A system comprising:
a computing device configured to:
receive data for a plurality of wireless channels;
determine, based on at least a portion of the data, an activity level for each wireless channel of the plurality of wireless channels;
determine, based on the activity level for each wireless channel of the plurality of wireless channels, a portion of the plurality of wireless channels that satisfy a zero data use activity level threshold;
determine, based on the portion of the plurality of wireless channels satisfying the zero data use activity level threshold, that the portion of the plurality of wireless channels are not available for recommendation to a user device; and
send, to the user device, an indication of a channel of a second portion of the plurality of wireless channels; and
the user device configured to:
receive the indication of the channel of the second portion of the plurality of wireless channels.

32. The system of claim 31, wherein the computing device is further configured to generate, based on the activity level for each wireless channel of the second portion of the plurality of wireless channels, a ranking of the second portion of the plurality of wireless channels.

33. The system of claim 31, wherein the zero data use activity level threshold captures one or more of the plurality of wireless channels with an activity level indicating one or more of zero activity or a small amount of activity on a respective wireless channel of the plurality of wireless channels.

34. The system of claim 31, wherein the computing device is further configured to:
determine the channel of the second portion of the plurality of wireless channels comprises a radar signal; and
determine, based on the activity level, a second channel of the second portion of the plurality of wireless channels.

35. The system of claim 31, wherein each wireless channel of the second portion of the plurality of wireless channels does not satisfy the zero data use activity level threshold.

36. The system of claim 31, wherein the activity level for each respective wireless channel of the plurality of wireless channels is determined based on one or more of a channel utilization for the respective wireless channel or a number of overlapping basic service sets (OBSS) for the respective wireless channel.

37. The system of claim 31, wherein the plurality of wireless channels comprise one or more of dynamic frequency selection (DFS) wireless channels or non-DFS wireless channels.

38. The system of claim 31, wherein the computing device is further configured to adjust, based on the data, the activity level for one or more of the plurality of wireless channels.

39. The system of claim 31, wherein the computing device is further configured to:
scan the channel of the second portion of the plurality of wireless channels for a radar signal; and
determine, based on the scan of the channel of the second portion of the plurality of wireless channels, the channel, of the second portion of the plurality of wireless channels, does not include the radar signal,
wherein the indication of the channel, of the second portion of the plurality of wireless channels, is sent to the user device based on the determination that the channel, of the second portion of the plurality of wireless channels, does not include the radar signal.

40. The system of claim 31, wherein an activity level for each wireless channel of the second portion of the plurality of wireless channels indicates at least some activity on each respective wireless channel of the second portion of the plurality of wireless channels.

* * * * *